US012615275B2

(12) United States Patent
Almadi

(10) Patent No.: US 12,615,275 B2
(45) Date of Patent: Apr. 28, 2026

(54) METHOD AND SYSTEM FOR INTEGRATED CYBERSECURITY OPERATIONS

(71) Applicant: Saudi Arabian Oil Company, Dhahran (SA)

(72) Inventor: Soloman M. Almadi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 34 days.

(21) Appl. No.: 18/741,350

(22) Filed: Jun. 12, 2024

(65) Prior Publication Data

US 2024/0430285 A1 Dec. 26, 2024

Related U.S. Application Data

(60) Provisional application No. 63/509,440, filed on Jun. 21, 2023.

(51) Int. Cl.
*H04L 9/40* (2022.01)
(52) U.S. Cl.
CPC ...... *H04L 63/1425* (2013.01); *H04L 63/1416* (2013.01)
(58) Field of Classification Search
CPC ............. H04L 63/1425; H04L 63/1416; H04L 63/1433
See application file for complete search history.

(56) References Cited

U.S. PATENT DOCUMENTS 3,104,549 A 9/1963 Humbert et al.
3,316,767 A 5/1967 Liebert
(Continued)

FOREIGN PATENT DOCUMENTS

WO WO-2019220363 A1 * 11/2019 ......... H04L 63/1425
WO WO 2020102601 5/2020
WO WO-2020102601 A1 * 5/2020 ......... H04L 63/1425

OTHER PUBLICATIONS

Almadi et al., "Intelligent Field Infrastructure Adoption: Approach and Best Practices," presented at the SPE intelligent Energy International Conference, Utrecht, The Netherlands, Mar. 27-29, 2012, 12 pages.

(Continued)

*Primary Examiner* — Richard G Keehn
(74) *Attorney, Agent, or Firm* — Fish & Richardson P.C.

(57) ABSTRACT

Systems and methods include a computer-implemented cybersecurity data analytics system. An asset inventory is determined that identifies systems in a network. A baseline activity of the systems is determined using the asset inventory. The determining includes monitoring the systems during a time in which cybersecurity is secure. A real-time model of endpoints is generated using the baseline activity. The real-time model of endpoints includes endpoints communicating between systems in the network and reflects the baseline activity of, and communication among, the endpoints during the time in which cybersecurity is secure. The systems are monitored, including detecting, using the real-time model of endpoints, cybersecurity-related anomalies in the network that deviate from the baseline activity. Actionable alerts are generated by the cybersecurity data analytics system by using at least the detected cybersecurity-related anomalies. The actionable alerts are displayed in a user interface and notify of potential and actual process disruptions.

20 Claims, 10 Drawing Sheets

(56) References Cited

U.S. PATENT DOCUMENTS

| | | | |
|---|---|---|---|
| 3,373,608 | A | 3/1968 | Ketelsen |
| 4,051,723 | A | 10/1977 | Head et al. |
| 4,517,846 | A | 5/1985 | Harrison et al. |
| 4,757,314 | A | 7/1988 | Aubin |
| 4,777,833 | A | 10/1988 | Carpenter |
| 4,901,018 | A | 2/1990 | Lew |
| 4,965,996 | A | 10/1990 | Hartevelt |
| 5,067,345 | A | 11/1991 | Mougne |
| 5,090,250 | A | 2/1992 | Wada |
| 5,164,897 | A | 11/1992 | Clark |
| 5,259,239 | A | 11/1993 | Gaisford |
| 5,392,648 | A | 2/1995 | Robertson |
| 5,417,118 | A | 5/1995 | Lew et al. |
| 5,586,310 | A | 12/1996 | Sharman |
| 5,793,880 | A | 8/1998 | Constant |
| 5,975,204 | A | 11/1999 | Tubel et al. |
| 6,006,831 | A | 12/1999 | Schlemmer et al. |
| 6,046,685 | A | 4/2000 | Tubel |
| 6,085,599 | A | 7/2000 | Feller |
| 6,106,032 | A | 8/2000 | Och |
| 6,163,257 | A | 12/2000 | Tracy |
| 6,237,424 | B1 | 5/2001 | Salmasi et al. |
| 6,356,844 | B2 | 3/2002 | Thomas et al. |
| 6,463,807 | B1 | 10/2002 | Feller |
| 6,626,048 | B1 | 9/2003 | Dam Es et al. |
| 6,747,372 | B2 | 6/2004 | Gilbreth et al. |
| 6,795,655 | B1 | 9/2004 | Sidorovich et al. |
| 6,798,445 | B1 | 9/2004 | Brumitt et al. |
| 6,882,904 | B1 | 4/2005 | Petrie et al. |
| 6,920,799 | B1 | 7/2005 | Schulz |
| 6,934,477 | B2 | 8/2005 | Willebrand |
| 6,950,825 | B2 | 9/2005 | Chang et al. |
| 7,015,800 | B2 | 3/2006 | Lesesky et al. |
| 7,259,688 | B2 | 8/2007 | Hirsch et al. |
| 7,265,544 | B2 | 9/2007 | Keese |
| 7,469,188 | B2 | 12/2008 | Wee |
| 7,478,024 | B2 | 1/2009 | Gurpinar et al. |
| 7,493,140 | B2 | 2/2009 | Michmerhuizen et al. |
| 7,536,547 | B2 | 5/2009 | Van Den Tillaart |
| 7,540,202 | B2 | 6/2009 | Bier |
| 7,574,907 | B2 | 8/2009 | Maute |
| 7,584,165 | B2 | 9/2009 | Buchan |
| 7,644,290 | B2 | 1/2010 | Ransom et al. |
| 7,653,936 | B2 | 1/2010 | Oberst |
| 7,739,359 | B1 | 6/2010 | Millet et al. |
| 7,828,065 | B2 | 11/2010 | Ross |
| 7,933,989 | B1 | 4/2011 | Barker et al. |
| 7,940,302 | B2 | 5/2011 | Mehrotra et al. |
| 8,039,991 | B2 | 10/2011 | Wakitani et al. |
| 8,051,722 | B2 | 11/2011 | Voigt et al. |
| 8,102,238 | B2 | 1/2012 | Golander et al. |
| 8,135,281 | B2 | 3/2012 | Zhovnirovsky et al. |
| 8,195,590 | B1 | 6/2012 | Storek |
| 8,254,785 | B1 | 8/2012 | Bushman et al. |
| 8,271,212 | B2 | 9/2012 | Sai et al. |
| 8,280,635 | B2 | 10/2012 | Ella et al. |
| 8,312,320 | B2 | 11/2012 | Almadi |
| 8,323,392 | B2 | 12/2012 | Jones et al. |
| 8,334,775 | B2 | 12/2012 | Tapp et al. |
| 8,359,171 | B2 | 1/2013 | Bleys et al. |
| 8,365,250 | B2 | 1/2013 | Denny |
| 8,365,612 | B2 | 2/2013 | Izumi |
| 8,494,218 | B2 | 7/2013 | Chen et al. |
| 8,543,716 | B1 | 9/2013 | Rashidi |
| 8,667,091 | B2 | 3/2014 | Almadi |
| 8,732,106 | B1 | 5/2014 | Presgraves et al. |
| 8,750,513 | B2 | 6/2014 | Renkis |
| 8,761,911 | B1 | 6/2014 | Chapman et al. |
| 8,792,115 | B2 | 7/2014 | Harano |
| 8,875,379 | B2 | 11/2014 | Maute |
| 8,884,759 | B2 | 11/2014 | Oktem et al. |
| 8,887,241 | B2 | 11/2014 | Britton et al. |
| 8,972,742 | B2 | 3/2015 | Troncoso Pastoriza et al. |
| 9,147,174 | B2 | 9/2015 | Glickman et al. |
| 9,208,676 | B2 | 12/2015 | Fadell et al. |
| 9,210,179 | B2 | 12/2015 | Mevec et al. |
| 9,215,244 | B2 * | 12/2015 | Ayyagari ............ H04L 63/1425 |
| 9,391,701 | B2 | 7/2016 | Zearnari et al. |
| 9,396,599 | B1 | 7/2016 | Malhotra |
| 9,467,472 | B2 | 10/2016 | Weiner et al. |
| 9,654,222 | B1 | 5/2017 | Shatz et al. |
| 9,699,768 | B2 | 7/2017 | Werb |
| 9,760,075 | B2 | 9/2017 | Fisher-Rosemont |
| 10,088,840 | B2 | 10/2018 | Dorval et al. |
| 10,250,619 | B1 | 4/2019 | Park et al. |
| 10,330,511 | B2 | 6/2019 | Alkhabbaz et al. |
| 10,411,812 | B1 | 9/2019 | Rose |
| 10,462,884 | B2 | 10/2019 | Jayawardena et al. |
| 10,466,722 | B2 | 11/2019 | Mortensen et al. |
| 10,514,415 | B2 | 12/2019 | Jayawardena et al. |
| 10,551,047 | B2 | 2/2020 | Treible, Jr. et al. |
| 10,594,714 | B2 * | 3/2020 | Crabtree ............ H04L 63/1425 |
| 10,897,398 | B2 | 1/2021 | Al-Yousef et al. |
| 11,005,872 | B2 * | 5/2021 | Dherange ........... H04L 63/1425 |
| 11,038,594 | B1 | 6/2021 | Claycomb et al. |
| 11,288,378 | B2 | 3/2022 | Al-Yousef et al. |
| 11,503,054 | B2 * | 11/2022 | Furtak ................ H04L 63/1416 |
| 11,916,591 | B2 | 2/2024 | Almadi |
| 11,924,903 | B2 | 3/2024 | Mujica et al. |
| 2002/0152053 | A1 | 10/2002 | Roy et al. |
| 2002/0154137 | A1 | 10/2002 | Ben-David |
| 2003/0117298 | A1 | 6/2003 | Seely |
| 2004/0045368 | A1 | 3/2004 | Schoeb |
| 2004/0098592 | A1 | 5/2004 | Taki |
| 2004/0188710 | A1 | 9/2004 | Koren et al. |
| 2005/0005093 | A1 | 1/2005 | Bartels et al. |
| 2005/0015624 | A1 | 1/2005 | Ginter et al. |
| 2005/0143133 | A1 | 6/2005 | Bridgelall |
| 2005/0184084 | A1 | 8/2005 | Wells |
| 2005/0193832 | A1 | 9/2005 | Tombs et al. |
| 2005/0228683 | A1 | 10/2005 | Saylor et al. |
| 2005/0254714 | A1 | 11/2005 | Anne |
| 2006/0032547 | A1 | 2/2006 | Rossi |
| 2006/0085174 | A1 | 4/2006 | Hemanthkumar |
| 2006/0086497 | A1 | 4/2006 | Ohmer et al. |
| 2006/0107061 | A1 | 5/2006 | Holovacs |
| 2007/0018009 | A1 | 1/2007 | Choi et al. |
| 2007/0124026 | A1 | 5/2007 | Troxell et al. |
| 2007/0126576 | A1 | 6/2007 | Script et al. |
| 2007/0163359 | A1 | 7/2007 | Nielsen |
| 2007/0193834 | A1 | 8/2007 | Pai |
| 2007/0198223 | A1 | 8/2007 | Ella et al. |
| 2008/0061984 | A1 | 3/2008 | Breed et al. |
| 2008/0109883 | A1 | 5/2008 | Hernoud et al. |
| 2008/0109889 | A1 | 5/2008 | Bartels et al. |
| 2008/0139195 | A1 | 6/2008 | Marsyla et al. |
| 2008/0228908 | A1 | 9/2008 | Link |
| 2008/0251260 | A1 | 10/2008 | Ross et al. |
| 2008/0274766 | A1 | 11/2008 | Pratt et al. |
| 2009/0012631 | A1 | 1/2009 | Fuller |
| 2009/0037607 | A1 | 2/2009 | Farinacci et al. |
| 2009/0089108 | A1 | 4/2009 | Angell et al. |
| 2009/0141896 | A1 | 6/2009 | McCown |
| 2009/0210081 | A1 | 8/2009 | Sustaeta |
| 2009/0224930 | A1 | 9/2009 | Burza |
| 2010/0034540 | A1 | 2/2010 | Togashi |
| 2010/0058052 | A1 | 3/2010 | Bartels et al. |
| 2010/0097205 | A1 | 4/2010 | Script |
| 2010/0172651 | A1 | 7/2010 | Nien et al. |
| 2010/0228584 | A1 | 9/2010 | Nash |
| 2010/0231410 | A1 | 9/2010 | Seisenberger |
| 2010/0284611 | A1 | 11/2010 | Lee et al. |
| 2010/0292857 | A1 | 11/2010 | Bose et al. |
| 2011/0007171 | A1 | 1/2011 | Okumura et al. |
| 2011/0066454 | A1 | 3/2011 | Rosauer et al. |
| 2011/0071963 | A1 | 3/2011 | Piovesan et al. |
| 2011/0074551 | A1 | 3/2011 | Higashionji |
| 2011/0178977 | A1 | 7/2011 | Drees |
| 2011/0181426 | A1 | 7/2011 | Bucciero et al. |
| 2011/0288692 | A1 | 11/2011 | Scott |
| 2011/0296377 | A1 | 12/2011 | Morozov et al. |
| 2011/0303826 | A1 | 12/2011 | Liou et al. |
| 2012/0022700 | A1 | 1/2012 | Drees et al. |
| 2012/0031494 | A1 | 2/2012 | Lymberopoulos |

(56) References Cited

U.S. PATENT DOCUMENTS

| | | | |
|---|---|---|---|
| 2012/0059634 A1 | 3/2012 | Bouzarkouna | |
| 2012/0060030 A1 | 3/2012 | Lamb | |
| 2012/0063354 A1 | 3/2012 | Vanga et al. | |
| 2012/0084400 A1 | 4/2012 | Almadi et al. | |
| 2012/0162423 A1 | 6/2012 | Xiao | |
| 2012/0172085 A1 | 7/2012 | Vuppu | |
| 2012/0307051 A1 | 12/2012 | Welter | |
| 2013/0013932 A1 | 1/2013 | Kong et al. | |
| 2013/0085687 A1 | 4/2013 | Danov et al. | |
| 2013/0086650 A1 | 4/2013 | Soundrapandian et al. | |
| 2013/0088429 A1 | 4/2013 | Yang | |
| 2013/0103749 A1 | 4/2013 | Weth et al. | |
| 2013/0110411 A1 | 5/2013 | Black et al. | |
| 2013/0136597 A1 | 5/2013 | Hansen et al. | |
| 2013/0151020 A1 | 6/2013 | Manninen et al. | |
| 2013/0151849 A1 | 6/2013 | Graham et al. | |
| 2013/0162405 A1 | 6/2013 | Forster | |
| 2013/0212259 A1 | 8/2013 | Rankov et al. | |
| 2013/0232338 A1 | 9/2013 | Byres et al. | |
| 2013/0246333 A1 | 9/2013 | Presgraves et al. | |
| 2013/0247117 A1 | 9/2013 | Yamada | |
| 2013/0282641 A1 | 10/2013 | Martin et al. | |
| 2014/0019768 A1 | 1/2014 | Pineau et al. | |
| 2014/0046863 A1 | 2/2014 | Gifford et al. | |
| 2014/0089671 A1 | 3/2014 | Logue | |
| 2014/0118239 A1 | 5/2014 | Phillips | |
| 2014/0130874 A1 | 5/2014 | Burlage et al. | |
| 2014/0139681 A1 | 5/2014 | Jones, Jr. et al. | |
| 2014/0150549 A1 | 6/2014 | Rieger et al. | |
| 2014/0156584 A1 | 6/2014 | Motukuri et al. | |
| 2014/0165182 A1 | 6/2014 | Curry et al. | |
| 2014/0230057 A1 | 8/2014 | Berger | |
| 2014/0240088 A1 | 8/2014 | Robinette | |
| 2014/0254799 A1 | 9/2014 | Husted | |
| 2014/0261791 A1 | 9/2014 | Grabau et al. | |
| 2014/0280953 A1 | 9/2014 | Brzozowski et al. | |
| 2014/0298399 A1 | 10/2014 | Heo et al. | |
| 2014/0310059 A1 | 10/2014 | Ellis | |
| 2014/0337086 A1 | 11/2014 | Asenjo et al. | |
| 2014/0342373 A1 | 11/2014 | Viovy et al. | |
| 2014/0343717 A1 | 11/2014 | Dorval et al. | |
| 2015/0055866 A1 | 2/2015 | Cummins et al. | |
| 2015/0074023 A1 | 3/2015 | Gu | |
| 2015/0109104 A1 | 4/2015 | Fadell | |
| 2015/0116111 A1 | 4/2015 | Foster | |
| 2015/0195789 A1 | 7/2015 | Yoon | |
| 2015/0205966 A1 | 7/2015 | Chowdhury | |
| 2015/0220321 A1 | 8/2015 | Jung | |
| 2015/0304346 A1 | 10/2015 | Kim | |
| 2015/0349881 A1 | 12/2015 | Byers | |
| 2016/0006745 A1 | 1/2016 | Furuichi | |
| 2016/0094578 A1 | 3/2016 | McQuillan et al. | |
| 2016/0100437 A1 | 4/2016 | Amstrong et al. | |
| 2016/0123111 A1 | 5/2016 | Kim | |
| 2016/0206136 A1 | 7/2016 | Storek | |
| 2016/0234239 A1 | 8/2016 | Knapp et al. | |
| 2016/0259637 A1 | 9/2016 | Kumar | |
| 2016/0259647 A1 | 9/2016 | Kim et al. | |
| 2016/0379211 A1 | 12/2016 | Hoyos | |
| 2017/0012878 A1 | 1/2017 | Rahman | |
| 2017/0031840 A1 | 2/2017 | Cawse et al. | |
| 2017/0032190 A1 | 2/2017 | Sato et al. | |
| 2017/0034193 A1 | 2/2017 | Schulman et al. | |
| 2017/0053224 A1 | 2/2017 | Duca et al. | |
| 2017/0061715 A1 | 3/2017 | Busch-Sorensen | |
| 2017/0124368 A1 | 5/2017 | Jang et al. | |
| 2017/0132809 A1 | 5/2017 | Hiroki et al. | |
| 2017/0184659 A1 | 6/2017 | Jayawardena et al. | |
| 2017/0284191 A1 | 10/2017 | Martin | |
| 2017/0289812 A1 | 10/2017 | Werb | |
| 2017/0302691 A1 | 10/2017 | Singh et al. | |
| 2017/0329783 A1 | 11/2017 | Singh et al. | |
| 2017/0353491 A1 | 12/2017 | Gukal | |
| 2017/0356780 A1 | 12/2017 | Smith et al. | |
| 2018/0092331 A1 | 4/2018 | Zuidhof | |
| 2018/0156437 A1 | 6/2018 | Freer et al. | |
| 2018/0255076 A1* | 9/2018 | Paine | H04L 63/1416 |
| 2018/0295154 A1* | 10/2018 | Crabtree | H04L 63/1433 |
| 2018/0299878 A1 | 10/2018 | Cella et al. | |
| 2019/0033852 A1 | 1/2019 | Dorval et al. | |
| 2019/0121338 A1 | 4/2019 | Cella et al. | |
| 2019/0149894 A1 | 5/2019 | Weatherhead et al. | |
| 2019/0159322 A1 | 5/2019 | Jayawardena et al. | |
| 2019/0162330 A1 | 5/2019 | Al-Ajmi et al. | |
| 2019/0222597 A1* | 7/2019 | Crabtree | H04L 63/1425 |
| 2019/0234603 A1 | 8/2019 | Treible, Jr. et al. | |
| 2019/0294124 A1 | 9/2019 | Law et al. | |
| 2019/0306250 A1 | 10/2019 | Kubo et al. | |
| 2019/0346839 A1 | 11/2019 | Dorval et al. | |
| 2019/0349254 A1 | 11/2019 | Nolan et al. | |
| 2020/0125470 A1 | 4/2020 | Cui et al. | |
| 2020/0190931 A1 | 6/2020 | Moen et al. | |
| 2020/0202008 A1 | 6/2020 | Pfleger de Aguiar et al. | |
| 2020/0208510 A1 | 7/2020 | Guijt et al. | |
| 2020/0228557 A1* | 7/2020 | Lin | H04L 63/1425 |
| 2020/0239329 A1 | 7/2020 | Patey | |
| 2020/0252288 A1 | 8/2020 | Al-Yousef et al. | |
| 2020/0336210 A1 | 10/2020 | Khatibzadeh et al. | |
| 2020/0371514 A1 | 11/2020 | Dorval et al. | |
| 2020/0412767 A1 | 12/2020 | Crabtree et al. | |
| 2021/0050917 A1 | 2/2021 | Ohta | |
| 2021/0115782 A1 | 4/2021 | Mujica et al. | |
| 2021/0157312 A1 | 5/2021 | Cella et al. | |
| 2021/0194580 A1 | 6/2021 | Das et al. | |
| 2021/0404315 A1 | 12/2021 | Parak et al. | |
| 2022/0060258 A1 | 2/2022 | Sasaki | |
| 2022/0110183 A1 | 4/2022 | Mujica et al. | |
| 2022/0162923 A1 | 5/2022 | Signaroldi et al. | |
| 2022/0263860 A1* | 8/2022 | Crabtree | H04L 63/1425 |
| 2022/0283562 A1 | 9/2022 | Al-Yousef et al. | |
| 2022/0345475 A1* | 10/2022 | Otto | H04L 63/1416 |
| 2022/0377093 A1* | 11/2022 | Crabtree | H04L 63/1425 |

OTHER PUBLICATIONS

Boman, "IoT Technology to Reduce Need for Oil, Gas Workers Offshore," Oct. 14, 2016, rigzone.com (online), retrieved from URL <https://www.rigzone.com/news/oil_gas/a/147044/iot_technology_to_reduce_need_for_oil_ga-workers_offshore/>, 5 pages.

Canaz, "Planar and Linear Feature-Based Registration of Terrestrial Laser Scans with Minimum Overlap Using Photogrammetric Data," Masters Thesis, University of Calgary, Dec. 2012, 142 pages.

Cohen, "Reducing Business Surprises through Proactive, Real-Time Sensing and Alert Management," EESR Workshop on End-to-End, Sense-and Respond Systems, Applications and Services, 2005, 6 pages.

Gokce et al., "Vision-Based Detection and Distance Estimation of Micro Unmanned Aerial Vehicles," Sensors, 2015, 15:23805-23846, 42 pages.

Hale, "Evaluating safety management and culture interventions to improve safety: Effective intervention strategies," Safety Science, Oct. 2010, 48:(8):1026-1035, 10 pages.

Huia et al., "Prediction of Safety Objective of an Enterprise using Fuzzy Neural Network," International Symposium on Safety Science and Engineering in China, Procedia Engineering, 2012, 43:162-167, 6 pages.

Husain et al., "Quantifying the Intelligent Field Added Values," presented at the SPE Middle East Intelligent Energy Conference and Exhibition, Manama, Bahrain, Oct. 28-30, 2013, 9 pages.

Memon et al., "Distributed control system for process control using intelligent agents," WSEAS Transactions on Systems, retrieved from URL <: https://www.researchgate.net/publication/270214069_Distributed_control_system_for_process_control_using_intelligent_agents>, retrieved on May 17, 2019, available on or before Mar. 1, 2006, 10 pages.

Offshore-technology.com (online), "Take Control: Smart Valves Step Forward," retrieved from URL <http://www.offshore-technology.com/features/feature2034/>, Jun. 18, 2008, 6 pages.

Petrie et al., "Chapter 1: Introduction to Laser Ranging, Profiling, and Scanning," Topographic Laser Ranging and Scanning: Principles and Processing, 2008, 29 pages.

(56) References Cited

OTHER PUBLICATIONS

Petrie et al., "Chapter 3: Terrestrial Laser Scanners," Topographic Laser Ranging and Scanning: Principles and Processing, 2009, 43 pages.

Pyimagesearch.com [online], Rosebrock, "Find distance from camera to object/marker using Python and OpenCV," Jan. 2015, retrieved on Oct. 21, 2020, retrieved from URL <https://www.pyimagesearch. com/2015/01/19/find-distance-camera-objectmarker-using-python-opencv/>, 109 pages.

Storey, "Building a Maintenance Management Program for Valves," Control Engineering, controleng.com (online), retrieved from URL <http://www.controleng.com/industry-news/single-article/building-a-maintenance-management-program-for-valves/ 20afd59f11c5dec4ec222cc79937e40b.html>, Apr. 17, 2014, 3 pages.

International Search Report and Written Opinion in International Appln. No. PCT/US2024/034725, mailed on Sep. 10, 2024, 15 pages.

* cited by examiner

500

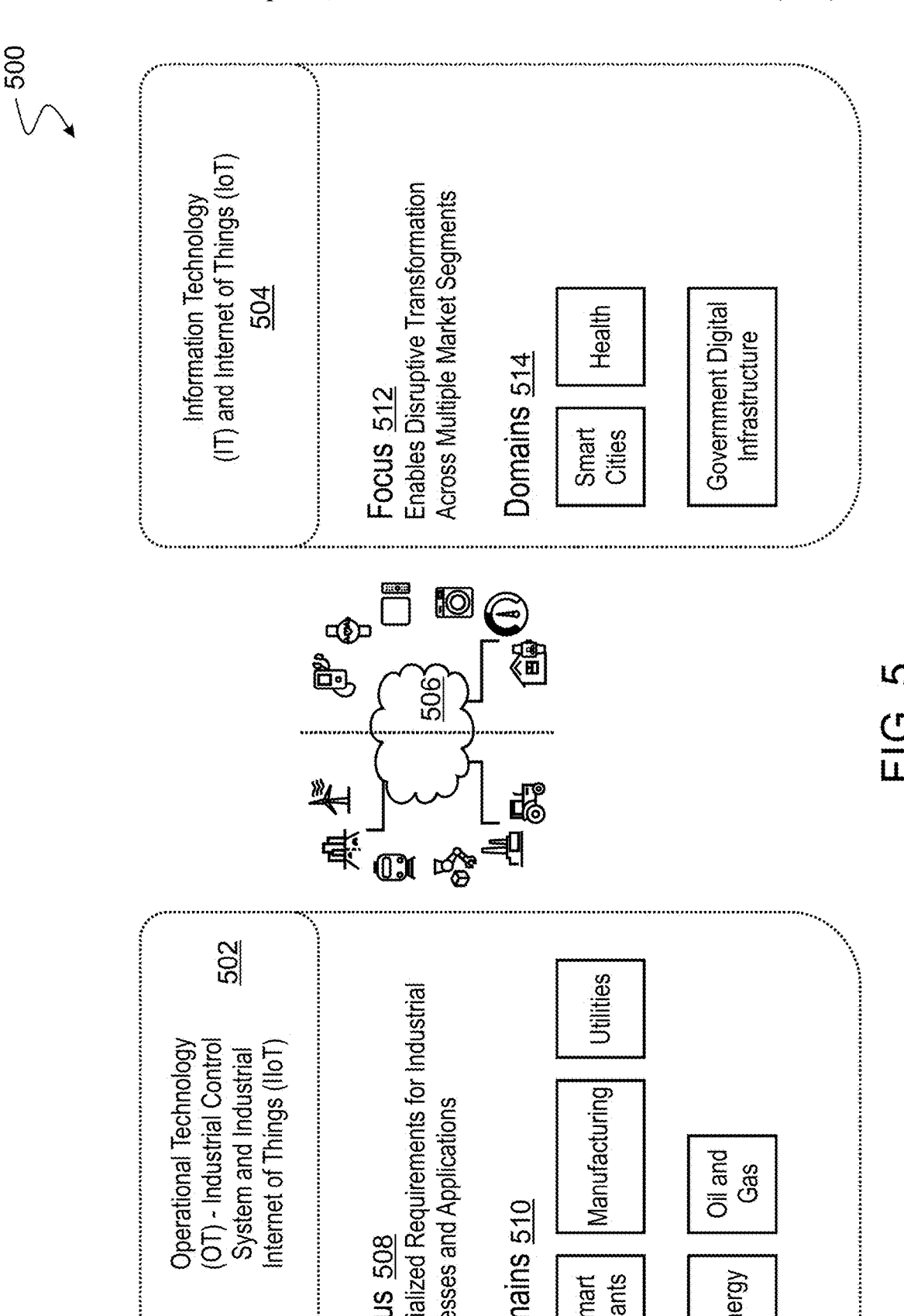

Information Technology
(IT) and Internet of Things (IoT)
504

Focus 512
Enables Disruptive Transformation
Across Multiple Market Segments

Domains 514

Smart
Cities

Health

Government Digital
Infrastructure

506

Operational Technology
(OT) - Industrial Control
System and Industrial
Internet of Things (IIoT)
502

Focus 508
Specialized Requirements for Industrial
Processes and Applications

Domains 510

Smart
Plants

Manufacturing

Utilities

Energy

Oil and
Gas

FIG. 5

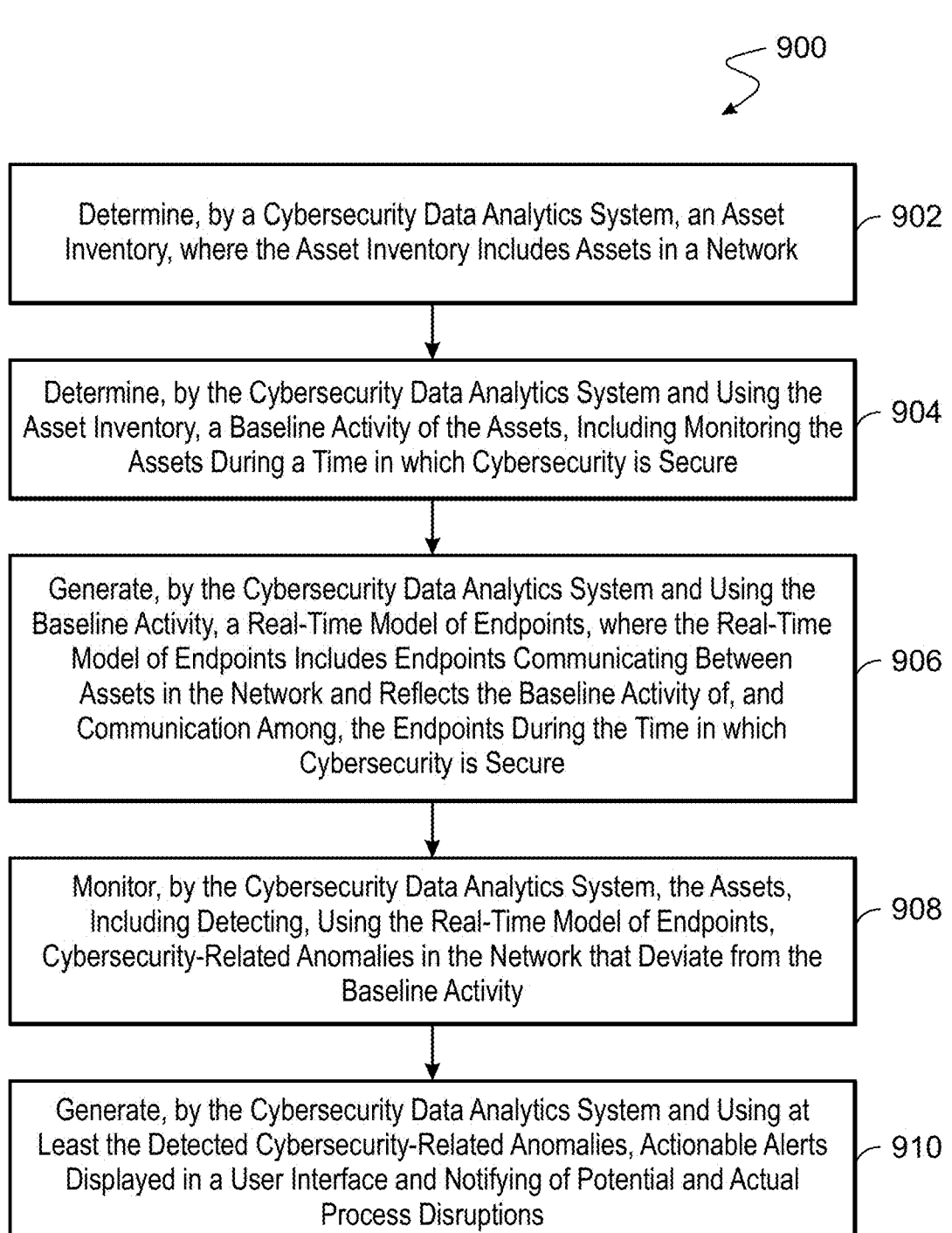

900

Determine, by a Cybersecurity Data Analytics System, an Asset Inventory, where the Asset Inventory Includes Assets in a Network ⟋ 902

Determine, by the Cybersecurity Data Analytics System and Using the Asset Inventory, a Baseline Activity of the Assets, Including Monitoring the Assets During a Time in which Cybersecurity is Secure ⟋ 904

Generate, by the Cybersecurity Data Analytics System and Using the Baseline Activity, a Real-Time Model of Endpoints, where the Real-Time Model of Endpoints Includes Endpoints Communicating Between Assets in the Network and Reflects the Baseline Activity of, and Communication Among, the Endpoints During the Time in which Cybersecurity is Secure ⟋ 906

Monitor, by the Cybersecurity Data Analytics System, the Assets, Including Detecting, Using the Real-Time Model of Endpoints, Cybersecurity-Related Anomalies in the Network that Deviate from the Baseline Activity ⟋ 908

Generate, by the Cybersecurity Data Analytics System and Using at Least the Detected Cybersecurity-Related Anomalies, Actionable Alerts Displayed in a User Interface and Notifying of Potential and Actual Process Disruptions ⟋ 910

FIG. 9

METHOD AND SYSTEM FOR INTEGRATED CYBERSECURITY OPERATIONS

CROSS-REFERENCE TO RELATED PATENT APPLICATIONS

This application claims the benefit of U.S. Provisional Application No. 63/509,440 filed Jun. 21, 2023, the contents of which are incorporated by reference herein.

TECHNICAL FIELD

The present disclosure applies to cybersecurity systems.

BACKGROUND

Current cybersecurity operations typically include a cumbersome aspect in which skilled workforces are needed to extract data, analyze the data, and move the data to a usable format that can be used in operational tasks. Current challenges in today's cybersecurity operations can be summarized in the following. Each single cybersecurity system typically provides its own specific operational capabilities and functions for tracking specific statuses and generating reports based on initiated queries. Each single solution operates in isolation without a standard system interface for exchanging data with other systems. For example, plant cybersecurity operations may focus on implementing cybersecurity mitigations and controls, while conducting reviews and compliance, and while identifying anomalies based on different unique solutions, but lacking interfaces between them. Further, cybersecurity events and logs are typically supported by a system different than the compliance tool or an anomaly detection system. In addition, risk identification, mitigation, mitigation implementations, and implementation validation are typically based different independent tools. Furthermore, cybersecurity auditing is supported by different tools and workflows. Cybersecurity services such as antivirus, access control, domain controllers, and whitelisting/blacklisting status and behavior, is tracked by each individual system. Each single system further requires specialized subject matter expertise to extract valuable and important findings that are necessary for the entity's operational cybersecurity. Moreover, support of operational tasks and workflows are based on manual initiation and human interaction. The tasks are executed in isolation without consideration of task priority, workforce requirements, and inter-relationships with other tasks. Operational tasks may be defaulted to daily, weekly, or monthly execution, or based on ad hoc processes through mostly manual efforts. In addition, current cybersecurity operations are typically resource intensive and may cover disparate geographical areas. Moreover, there are different reference resources that may trigger cybersecurity operations from a configuration and compliance perspective. These different reference resources can be based on industry standards, an entity's standards and guidelines, and actual infrastructure baseline cybersecurity. The resulting different silos can create cumbersome efforts for cybersecurity operations based on actual unique implementations. In addition, depicting real-time cybersecurity operation status at the facility level, the holistic entity level, and a similar system level is typically ad hoc, under manual processes that are lengthy and prone to quality and integrity issues. In addition, cybersecurity antivirus scanning and cleansing tools may exist in an operation that is isolated from external real-time virus dedication and cleansing platforms. This can require ad hoc tools and specialized infrastructure.

SUMMARY

The present disclosure describes techniques that can be used for integrating cybersecurity operations. In some implementations, a computer-implemented method includes the following. An asset inventory is determined by a cybersecurity data analytics system. The asset inventory includes assets in a network. A network composed of network connectivity and communication devices, automation systems, instrumentation, and or computing infrastructure. A baseline activity of the assets is determined by the cybersecurity data analytics system by using the asset inventory. The determining includes monitoring the assets during a time in which cybersecurity is secure. A real-time model of endpoints is generated by the cybersecurity data analytics system using the baseline activity. The real-time model of endpoints includes endpoints communicating between assets in the network and reflects the baseline activity of, and communication among, the endpoints during the time in which cybersecurity is secure. The assets are monitored by the cybersecurity data analytics system, including detecting, using the real-time model of endpoints, cybersecurity-related anomalies in the network that deviate from the baseline activity. Actionable alerts are generated by the cybersecurity data analytics system by using at least the detected cybersecurity-related anomalies and or noncompliance (i.e., deviation from cybersecurity limits). The actionable alerts are displayed in a user interface and notify of potential and actual process disruptions.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The subject matter described in this specification can be implemented in particular implementations, so as to realize one or more of the following advantages. First, the techniques of the present disclosure include cybersecurity next generation capabilities to address the cybersecurity challenges and shortcomings of disparate systems. Second, the techniques described in the present disclosure can be used to proactively optimize cybersecurity operational resources, increase overall cybersecurity service delivery quality, eliminate manual efforts in accessing multiple data sources, analyzing data through enabled data analytics, provide artificial intelligence (AI)/machine learning (ML) capabilities for use in producing preventive and proactive recommendations, and eliminate rework. Third, an apparatus platform described in the present disclosure can provide high-speed computing power and multi-functions that can be deployed on a single device or multiple devices. Fourth, techniques of the present disclosure can result in faster response times to events that may affect the safety and reliability of a plant. Fifth, different cybersecurity standards references and requirements by different entities can be correlated to avoid duplication efforts and workflows. Sixth, cybersecurity mitigation implementation recommendations triggered by either cybersecurity solutions and/or standards references can be cross-referenced and correlated to avoid uncontrolled field mitigation configuration override. Seventh, techniques of the present disclosure can result in real-time cybersecurity operation status depiction at the device level, autonomous system level, overall plant level, and cross-plant level in real time triggering automatic response actions two address high level cybersecurity risk. Eighth, techniques of the present disclosure can result in proactive mapping reported threats and vulnerabilities from internal or external data sources to existing assets (e.g., computing devices and/or industrial machines including processors) across the whole operation of an industrial system.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

FIG. 5 is a diagram showing example components of a data source layer, according to some implementations of the present disclosure.

FIG. 9 is a flowchart of an example of a method for monitoring a cybersecurity data analytics system, according to some implementations of the present disclosure.

Like reference numbers and designations in the various drawings indicate like elements.

DETAILED DESCRIPTION

Figure 1:
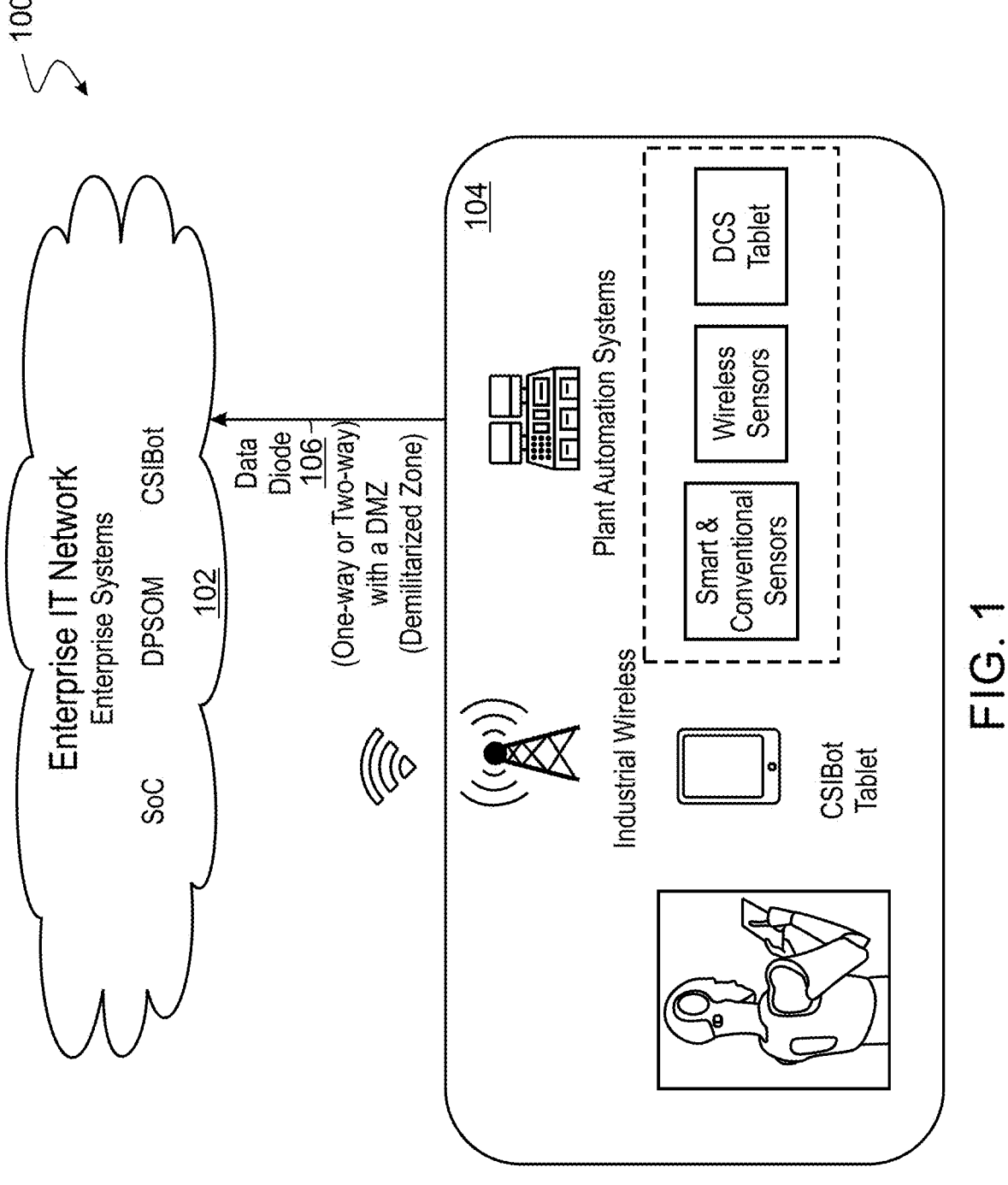
FIG. 1 is a diagram showing an example of a method and system for integrated cybersecurity operations (MSICSO), according to some implementations of the present disclosure.

The following detailed description describes techniques for integrating cybersecurity operations. Various modifications, alterations, and permutations of the disclosed implementations can be made and will be readily apparent to those of ordinary skill in the art, and the general principles defined may be applied to other implementations and applications, without departing from the scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

The present disclosure describes techniques for a method and system for integrated cybersecurity operations (MSICSO). The MSICSO is based on a Universal Access Digital Apparatus (UADA) with computing capabilities and application hosting that can be supported using, for example, a digital tablet, a laptop, or a smart phone. The UADA has the capability to interface and communicate with a unified application (UA) platform. The UA is supported by one or more of a centralized server, distributed servers, and the Cloud. In this way, the UA has the ability to access to industrial and non-industrial cybersecurity service delivery solutions and systems. The access can be implemented using application programming interfaces (APIs). The UA platform can include capabilities for providing features such as: concurrently accessing multiple data sources of cybersecurity service delivery, cybersecurity standards, cybersecurity baseline configuration databases, and external databases of cybersecurity threats and vulnerabilities. The UA platform can support concurrent extraction of multiple types of data from the different databases based on defined attributes and template schemes. The UA platform can support processing of advanced data analytics, providing real-time reporting, initiating, tracking, and updating of work-process schedules, knowledge content delivery, advance real-time data cleansing, and user, location- and time-based aware capabilities.

The UA platform has the ability to interface with third-party international standard content, industrial control system (ICS) vendors, specific ICS cybersecurity attributes (e.g., patches), and cybersecurity vendor solutions (e.g., anomaly detection tools, compliance tools, and firewalls). The UA platform can be capable of providing the UADA and automated system data in support of optimum cybersecurity controls, compliance, anomalies, and mitigation deployment and preventive maintenance planning, while proactively addressing the work schedule service delivery for a given operation.

The UA platform can be operated (including receiving and updating) in real-time mode or in non-real-time mode. This can occur under centrally or distributed deployment, and using interfaces with enterprise resource planning (ERP) systems and manufacturer systems. The UA platform can be connected to a network using wired or wireless communications. The UA platform can be a standalone device or can be placed in a virtual storage platform, using either or both of internal processing and/or an external computing cloud.

The UADA is a computing device that can host a software application (e.g., a client) that can send and receive data feeds to/from the UA platform. The UADA is capable of displaying processed data feeds from multiple sources. The UADA is capable of real-time reporting, work-process scheduling, knowledge content delivery, advanced real-time data cleansing, and user, location- and time-based aware capabilities.

The UADA has an adaptable interface that can connect to different devices and end user's equipment (e.g., laptop, servers, and universal serial buses (USBs)). The UADA has the ability to connect to third-party data and hardware cybersecurity cleansing capabilities. This includes Common File Systems Support (e.g., WINDOWS, MAC, LINUX, and UNIX), automatic or manual analysis of USB and different computing devices, active directory integration, detection of bad USBs, malware, and adware. Secure communication to a UADA UA application management server through auto managed virtual private network (VPN) with the capabilities of executing multiple antivirus engine scans at the same time.

A UADA antivirus (UADA-AVS) function can provide cleansing capabilities. The UADA can collect all AVS definitions from end devices and can provide the definitions to a management host server (MHS). End operational devices (e.g., control systems and information technology (IT) systems) can be scanned by the UADA-AVS to provide a complete report of vulnerabilities, missing patches, and recommended updates. Moreover, the UADA-AVS has the capability of supervised vulnerability removal.

A UADA knowledge streaming (UADA-KS) system can be used to map a user (e.g., a person, a computing device or an artificial intelligence engine) who logged into the UADA device to a competency map matrix. for example, in the case the user is a person, the mapping can be done according to the person's profile cybersecurity knowledge and maturity level. Knowledge data about a person can be obtained in real-time or on demand, e.g., streamed as needed to address gaps that are found by comparing the person's competency map matrix and the person's maturity level. The knowledge data can be developed internally, or may be fed by third-party training systems, or some combination thereof.

The cybersecurity capabilities described in the present disclosure can be hosted on a UADA device such as tablet, a laptop, or a smart phone, with capabilities for interfacing to the UA. The UA can have access to industrial and non-industrial cybersecurity service delivery solutions and systems. The access can be provided using standard APIs, for example.

The UA Platform is capable of concurrently accessing multiple data cybersecurity service delivery databases. The UA platform can also process advanced data analytics, supported by artificial intelligence (AI)/machine learning (ML). The advanced data analytics can provide proactive and preventive decision support and recommendations, real-time reporting, work-process schedule initiation, tracking, and updating, tailored knowledge content delivery based on the end user capabilities, advance real-time data cleansing, and system location and time-based aware capabilities.

FIG. 1 is a diagram showing an example of a method and system for an MSICSO 100, according to some implementations of the present disclosure. The MSICSO 100 can be implemented using the key components of the UADA and the UA platform.

The MSICSO 100 includes an enterprise IT network 102, including, for example, e.g., security operations center (SOC), deep probabilistic clustering with self-organizing maps (DPSOM), cybersecurity operational integration robot (CsiBot). The MSICSO 100 also includes plant automation systems 104 and demilitarized zone (DMZ) with or without a data diode (e.g., one-way or two-way) 106. The data diode 106 can include a system that facilitates one directional data transmission, enabling data to exit a field gateway in a particular direction and prevents data from entering the field gateway (e.g., from an opposite direction), by actively preventing two-way data transmission.

The enterprise IT network 102 includes a network connectivity and communication devices, automation systems, instrumentation, and or computing infrastructure. In some implementations, the enterprise IT network 102 can include a large computer network, such as a local area network, a wide area network, the Internet, a cellular network, a telephone network or an appropriate combination thereof connecting any number of communication devices, mobile computing devices, fixed computing devices and server systems. Data exchanged over the enterprise IT network 102, is transferred using any number of network layer protocols, such as internet protocol, multiprotocol label switching, asynchronous transfer mode, Frame Relay, etc. Furthermore, in implementations where the enterprise IT network 102 represents a combination of multiple sub-networks, different network layer protocols are used at each of the underlying sub-networks. In some implementations, the enterprise IT network 102 represents one or more interconnected internetworks, such as the public Internet.

The plant automation systems 104 include multiple systems (e.g., assets), such as computing systems (e.g., CSIBot tablet), and/or industrial machines, each including a memory, an interface, a processor and a cybersecurity engine. The memory can store data (e.g., cybersecurity data) and action plans for managing the cybersecurity of the plant automation systems 104. The cybersecurity data can include data that was previously recorded as time-domain series of system cybersecurity data, which can be analyzed, by the cybersecurity engine. In some implementations, an alert generation defined by the action plans can also point to an internal security regulation set within the example system 100 (e.g., regulations adjusted to manage system vulnerabilities by a field management system). The action plans in the memory can include action plan documents defining threat prevention mechanisms including operations that can be performed by the components the example system 100 to annihilate detected or estimated unsafe operations or to optimizes well management based on well production profiles and hydrocarbon reservoir depletion profiles determined by the cybersecurity engine. The cybersecurity engine can process cybersecurity data, obtained from the memory, using prediction models (e.g., machine learning models) according to the action plans.

The prediction models can be trained to model a normal pattern of life for systems connected to the network and to identify deviations from the normal pattern of life for the systems in the network for maintaining a cyber security of the plant automation systems 104. An initial training of the prediction models trained on cyber threats can occur using unsupervised learning and/or supervised learning on characteristics and attributes of known potential cyber threats including malware, insider threats, and other kinds of cyber threats that can occur within that domain. The prediction models learn at least both in the pre-deployment training: i) the characteristics and attributes of known potential cyber threats as well as ii) a set of characteristics and attributes of each category of potential cyber threats and their weights assigned on how indicative particular characteristics and attributes correlate to potential cyber threats of the respective category of threats. The prediction models can be trained with machine learning on possible cyber threats such as Linear Regression, Regression Trees, Non-Linear Regression, Bayesian Linear Regression, Deep learning, etc. to learn and identify the characteristics and attributes in that category of cyber threats. Trained prediction models can be deployed to analyze the cybersecurity data of the systems connected to the network 102 to determine whether a potentially unknown threat occurred, using cybersecurity detection techniques including an overlap of some of the same characteristics and attributes in that category of cyber threats.

In some implementations, the machine learning training of one or more prediction models can include training based on a normal behavior of the systems 104. Initial training of one or more prediction models trained with machine learning on a behavior of the pattern of life of the systems 104 connected to the network/domain 102 can occur where each type of network and/or domain will generally have some common typical behavior with each model trained specifically to understand components/devices, protocols, activity level, etc. to that type of network/system/domain. What is normal behavior of each system 104 can be defined during training (e.g., prior to deployment) and then adjusted during model deployment or alternatively the prediction model can simply be placed into an observation mode for an initial period of time (e.g., weeks or months) when first deployed on a network 102 in order to establish an initial normal behavior for systems 104 in the network/domain under analysis. During deployment, what is considered normal behavior can change as each different entity's behavior changes and can be reflected through the use of unsupervised learning in the model such as various Bayesian techniques, clustering, etc. The prediction models can be implemented with various mechanisms such as neural networks, decision trees, etc. and combinations of these. Likewise, one or more supervised machine learning prediction models can be trained to create possible hypotheses and perform cyber threat investigations on agnostic examples of past historical incidents of detecting different possible types of cyber threat conditions previously analyzed using cyber threat analysis feedback.

UADA Function

The UADA is based on computing and multi-applications hosting capabilities that can be supported by a fixed device or a mobile device (e.g., a digital tablet, a laptop, or a smart phone). The UADA has the capability to interface and communicate with UA platform. The UADA device is capable of receiving and concurrently updating multiple data cybersecurity service delivery databases, processed advance data analytics, AI/ML-generated recommendations, real-time reporting, and work-process scheduling, initiation, tracking, and updating. The UADA device is also capable of streaming tailored knowledge content delivery, providing advance real-time data cleansing, and providing location and time-based aware capabilities. UADA location mapping can be triggered on demand or as a function of the device's mobility. The UADA has the capabilities to interface to the UA based, for example, on a publish-and-subscribe software application model. Accordingly, certain selected data can be published on the UADA from the UA platform. Also, updates can be loaded from the UADA to the UA platform.

UADA Cybersecurity Operational Integration

The UADA can collect antivirus (AVS) definitions from end devices (e.g., computing devices, sensors, automation systems, and industrial machines performing operations at an industrial plant) and provide the AVS definitions to the Management Host Server (MHS). The MHS has access to different AVS suppliers' solutions. The MHS can push AV updates to UADA provide web interface to Security Analysts. The Security Analysts can monitor the end devices from single web interface from anywhere. A software containerization capability of the UADA can enable the generation and execution of unique applications based primarily on operating system (OS) libraries. Resulting applications can produce lightweight and portable executables that can operate on any infrastructure. The UADA has the capability to connect to the MHS over a secure VPN tunnel for upstream and downstream data. The MHS can host AV updates, OS updates (e.g., LINUX, WINDOWS, software, and upgrades), and the UADA-AVS.

Figure 2:
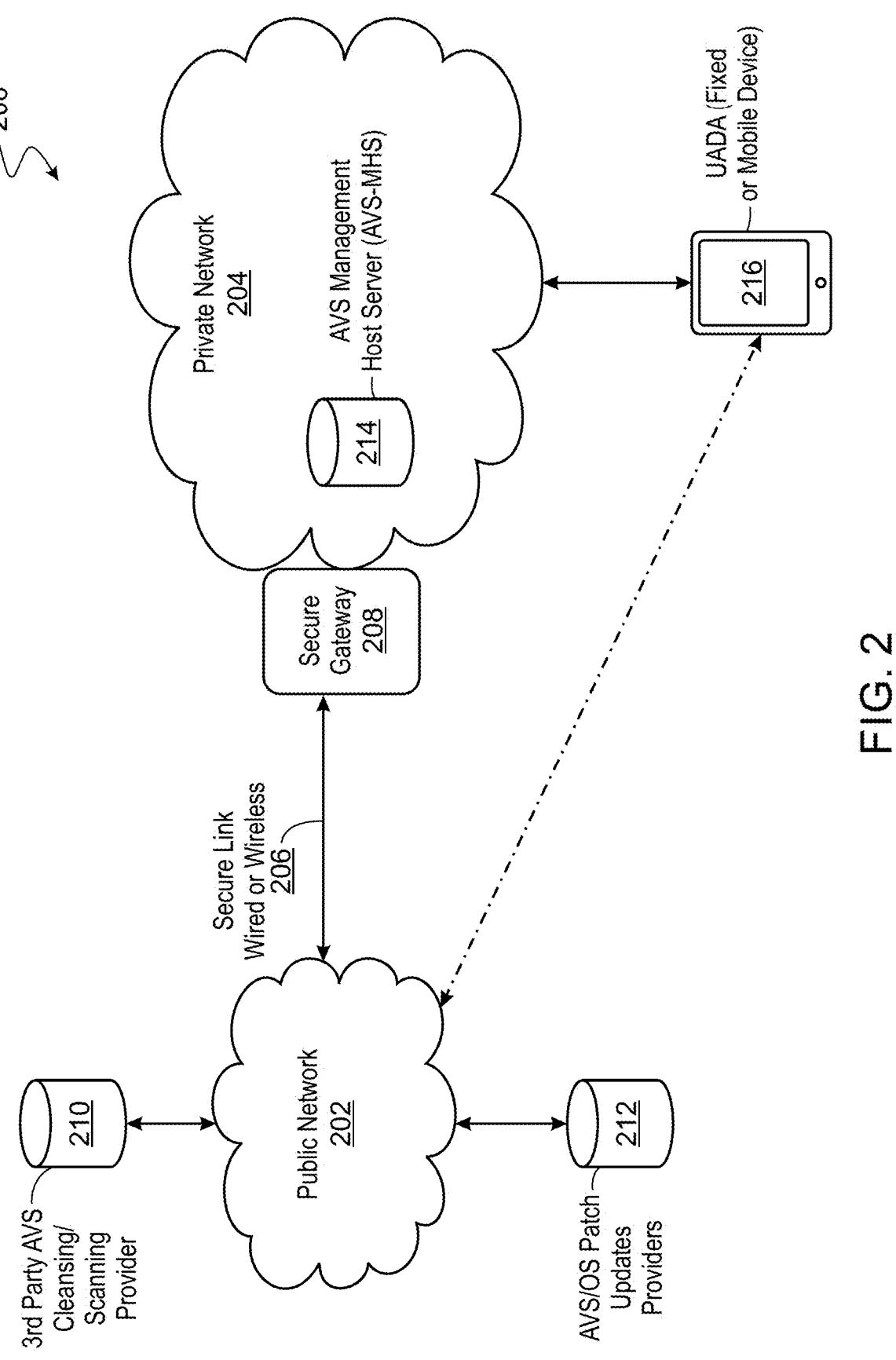
FIG. 2 is a diagram showing example components of a Universal Access Digital Apparatus (UADA) antivirus (AVS) system for providing cleansing capabilities, according to some implementations of the present disclosure.

FIG. 2 is a diagram showing example components of a UADA AVS system 200 for providing cleansing capabilities, according to some implementations of the present disclosure. As such, FIG. 2 shows an example of an antivirus cleansing patch updates management host server function. The UADA-AVS is based on AVS capabilities engines and definition updates, with the ability to receive a latest virus signature from an AVS Management Host Server (AVS-MHS). The UADA-AVS can include a physical interface capability with portable Wi-Fi USBs or physical cable interfaces that can be used connect to computer networks and systems to enable reachability to end systems for AVS scanning, cleansing, and remote access capabilities. The UADA-AVS has a dedicated container with operating system control, setup and updates, vulnerabilities scanning capabilities with analysis, reporting, and exports supported by the AVS-MHS. The AVS-MHS can be placed on the Cloud or on premises, using third-party-based solutions or combinations thereof.

Public network 202 can connect a private network 204, e.g., over a secure link 206 (e.g., wired or wireless) and using a secure gateway 208. The public network 202 can also connect third-party AVS cleansing/scanning provider 210 and AVS/OS patch updates providers 212. The private network 204 can host an AVS management host server (AVS-MHS) 214. The public network 202 and the private network 204 can connect a UADA 216 (e.g., fixed or mobile device).

UADA-KS

Figure 3:
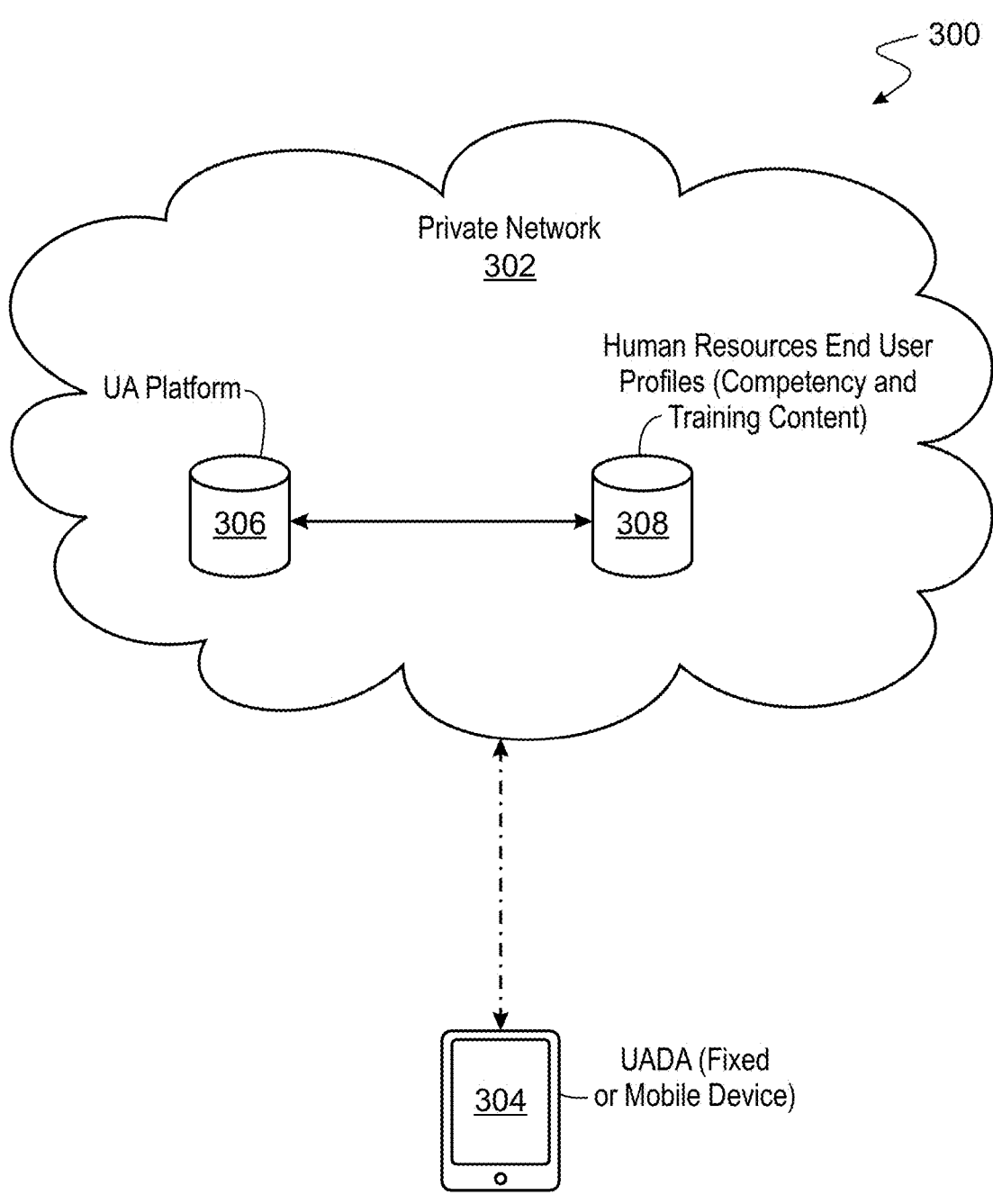
FIG. 3 is a diagram showing example components of a UADA knowledge streaming (KS) system, according to some implementations of the present disclosure.

FIG. 3 is a diagram showing example components of a UADA-KS system 300, according to some implementations of the present disclosure. Execution of the UADA-KS can be based on the UA platform having access to end user training profiles and competency levels in the domain of cybersecurity. The UA platform can have a built-in the competency map matrix and maturity level of the user based on configurable levels (e.g., foundation, maturity level 1, maturity level 2, and so on). The UADA can map the person that logged onto the UADA device to the competency map matrix. According to the respective profile cybersecurity knowledge and maturity level, knowledge data can be real-time or streamed on demand to address gaps that are found by comparing the competency map matrix and the maturity level. The knowledge data can be developed using a Machine Learning (ML)/AI embedded in the UA Platform and or may be fed by third-party training systems.

The UADA-KS system 300 includes a private network 302 accessible from a UADA 304 (e.g., the UADA 216, a fixed or mobile device). The private network 302 hosts a US platform 306 and human resources end user profiles 308 (e.g., competency and training content).

Unified Application (UA)

Figure 4:
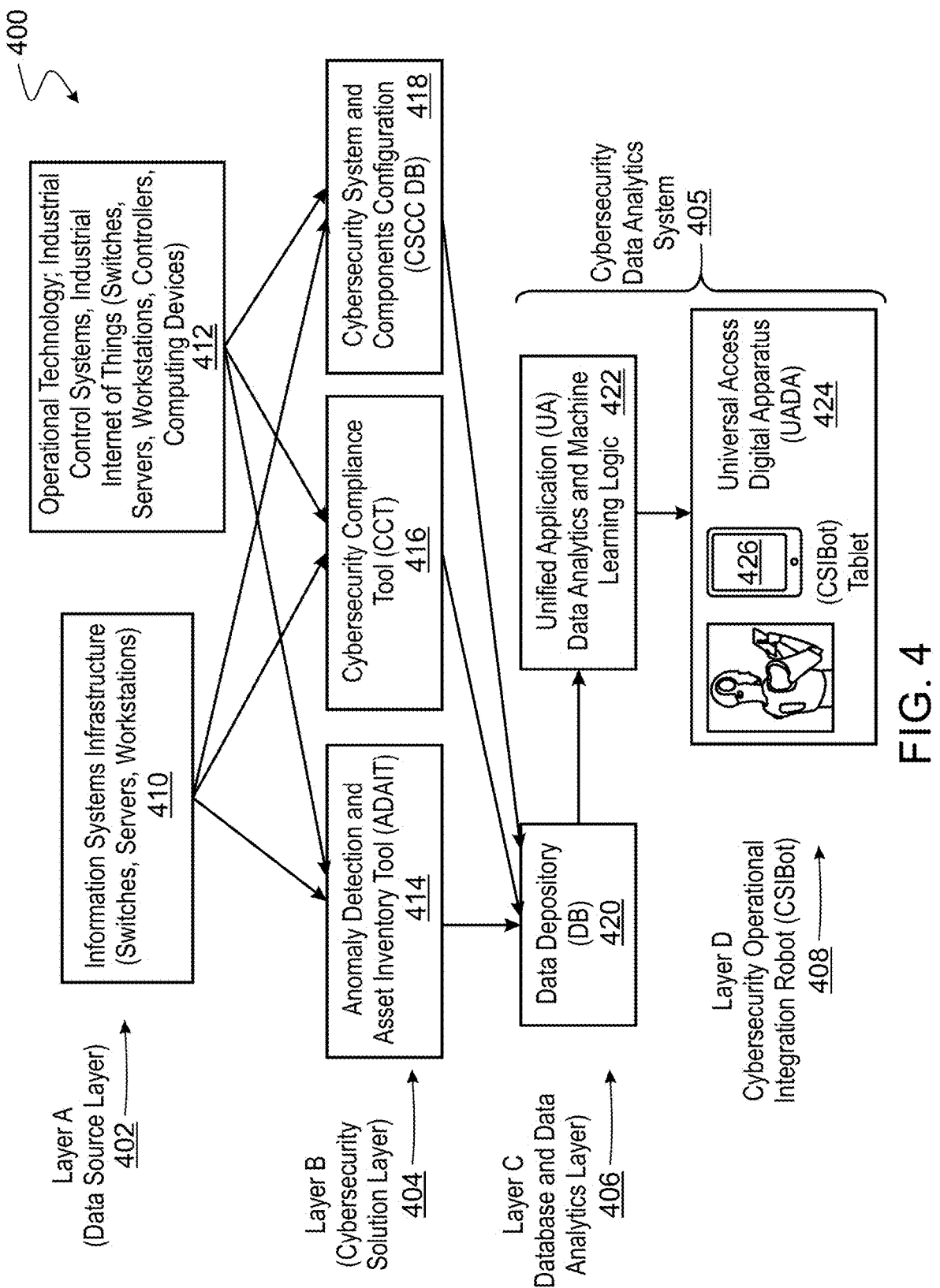
FIG. 4 is a diagram showing example components of a unified application (UA), according to some implementations of the present disclosure.

FIG. 4 is a diagram showing example components of a unified application 400, according to some implementations of the present disclosure. As such, FIG. 4 is a diagram showing an example of a method and system for an integrated cybersecurity operations system architecture. The UA 400 can be implemented according to a system architecture that consists of multiple (e.g., four) layers. Layer A 402 can serve as a data source layer. Layer B 404 can serve as a cybersecurity solution layer. Layer C 406 can serve as a database and data analytics layer used to implement a cybersecurity data analytics system 405. Layer D 408 can serve as a CsiBot.

Layer A—Data Source Layer

Layer A 402, serving as a data source layer, provides features related to domains of IT and operational technology systems. Techniques of the present disclosure can provide the intended cybersecurity capabilities and services for these two different domains. The two domains are based on computing, networking, sensors, automation systems, and applications that provide end users with services and or functionalities. FIG. 5 depicts coverage of the two different domains.

Layer A 402 includes an information systems infrastructure 410 (e.g., switches, servers, and workstations) and operational technology, an Industrial Control Systems (ICS), and an industrial Internet of Things (IoT) (IIoT) 412 (e.g., switches, servers, workstations, controllers, and computing devices). Layer B 404 includes an anomaly detection and asset inventory tool (ADAIT) 414, a cybersecurity compliance tool (CCT) 416, and a cybersecurity system and components configuration (CSCC) database 418. Layer C 406 includes a data depository (DD) 420 and a UA 422 (e.g., with data analytics and machine learning logic). Layer D 408 includes a UADA 424 with a CsiBot tablet 426.

FIG. 5 is a diagram showing example components of a data source layer 500, according to some implementations of the present disclosure. Layer A 402 can be implemented as the data source layer 500, for example. The data source layer 500 consists of systems that are used to support actual business functionalities, e.g., ERP systems, industrial controls systems, and IIoT systems. These different systems are composed of servers, computers, end user devices, databases, and sensors that are interconnected using communication and network systems. Cyber and operational data log generation and collections capabilities can cover operating systems and software applications, including some of the data sources generated by the Layer A 402. The cybersecurity protection for the Layer A 402 can be provided through Layer B 404 (the cybersecurity solution layer).

The data source layer 500 includes an operational technology (OT)—industrial control system and IIoT system 502 and an IT/IoT system 504, connected by a network 506. The system 502 provides focus 508 (including, for example, specialized requirements for industrial processes and applications) and domains 510 (including, for example, smart plants, manufacturing, utilities, energy, and oil and gas). The IT/IoT system 504 provides focus 512 (e.g., enabling disruptive transformation across multiple market segments) and domains 514 (including, for example, smart cities, health, and government digital infrastructure).

Layer B—Cybersecurity Solution Layer

Figure 6:
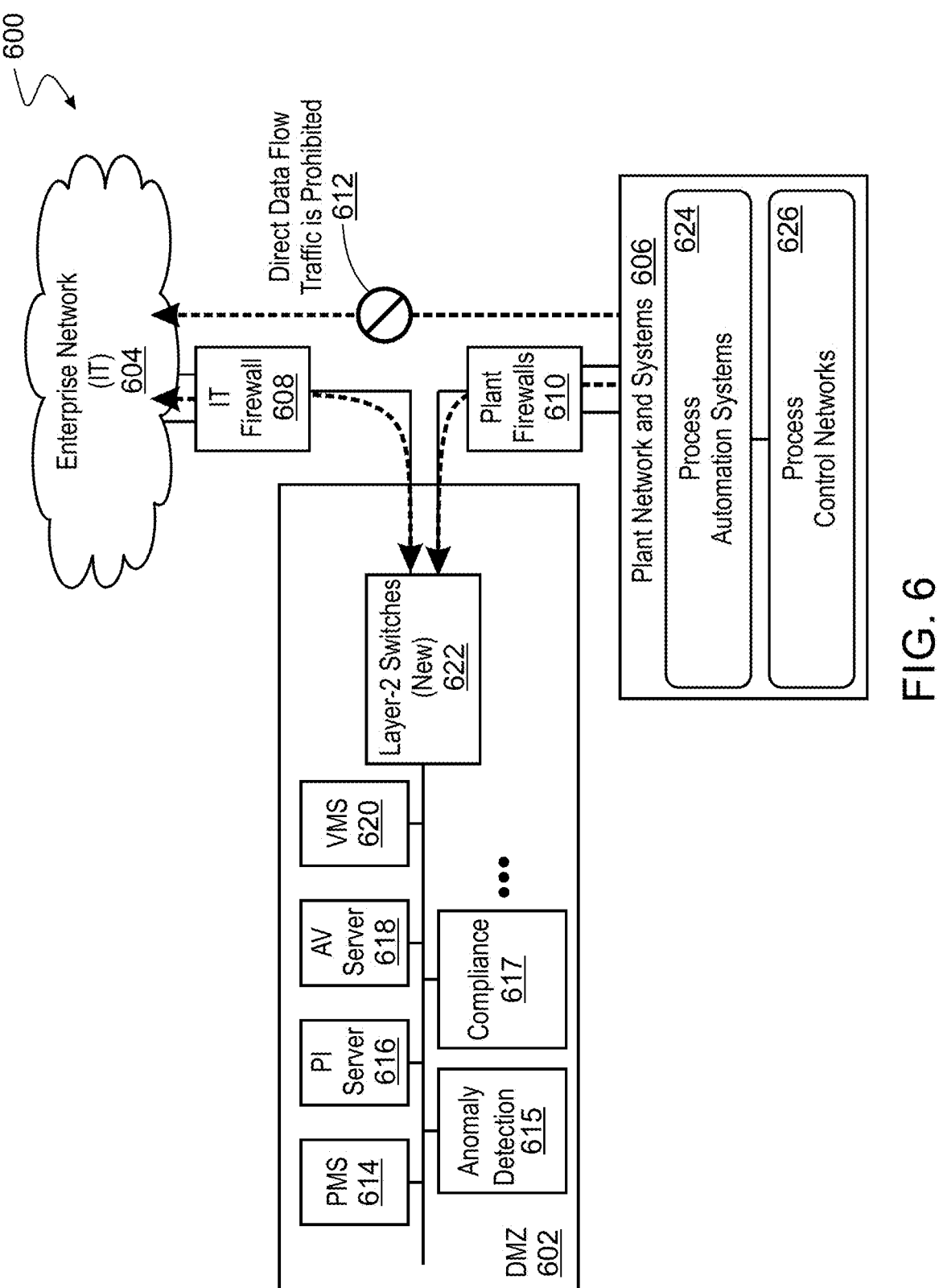
FIG. 6 is a diagram showing an example of a cybersecurity solution layer, according to some implementations of the present disclosure.

FIG. 6 is a diagram showing an example of a cybersecurity solution layer 600 (e.g., Layer B 404), according to some implementations of the present disclosure. The cybersecurity solution layer 600 can consist of hardware and software that each provides different cybersecurity functionalities. The functionalities can include network security, for example, consisting of setting up a secure architecture and subsequent performance of perimeter monitoring (e.g., firewalls). Moreover, access to the network can be authorized according to roles and users. A vulnerabilities monitoring component can provide functions to update firmware and implement a password management policy for different components. Security information and event management (SIEM) is another cybersecurity technology component of the cybersecurity solution layer. The SIEM can have access to logs from Layer A 402.

The cybersecurity solution layer 600 includes a demilitarized zone (DMZ) 602, an enterprise network 604, plant networks and systems 606 (e.g., including process automation systems 624 and process control networks 626), and IT firewalls 608 and 610. At 612, direct data flow traffic is prohibited. In some implementations, the DMZ 602 includes servers 614-620 and layer 2 switches 622.

Layer C—Database and Data Analytics Layer

Layer C 406, on which the cybersecurity data analytics system 405 is based, can be based on advanced data analytics capabilities with multiple different data analytics streams. There can be at least two primary data analytics streams: 1) anomaly-based monitoring and reporting, and 2) end point monitoring. Through machine learning, components of Layer C 406 can be used to monitor network traffic and flag anomalous behavior that has the potential to disrupt Layer A 402 systems.

Anomaly-based monitoring employs a completely passive approach to security by listening on spanning ports of network devices in a non-intrusive manner. This methodology ensures that network taps cannot hinder or interfere with Layer A 402 system functions. This functionality is made possible by up-front work completed using components of Layer C 406. For example, by employing deep packet inspection (DPI) and data mining technologies, Layer C 406 is then able to discover assets, learn network topology, model communication patterns, and create baseline behavior.

Once the cybersecurity data analytics system 405 can conclude its learning phase, a protection mode of the cybersecurity data analytics system 405 is able to detect any deviation from the baseline. The cybersecurity data analytics system 405 can also generate actionable alerts and notify of potential and actual process disruptions. These types of actions can enable faster response times to events that may affect the safety and reliability of a plant, for example.

An asset inventory function of the system 405 can be used to automatically identify and classify assets across an entire ICS network. This can help in meeting regulatory and internal audit requirements. A proactive network resilience function of the system 405 can be used to detect network health issues, network misconfigurations, insecure connections, software vulnerabilities, and remote connections. A real-time network visualization of the system 405 can be used in real-time modeling of the end points (end devices) communicating in the network. Monitoring can include displaying indications of directions of communications and protocols being used and applied on IT and OT protocols.

A security and operational alerts function of the system 405 can be used to flag critical changes. For example, depending on event context, the system 405 can flag critical changes such as controller downloads and uploads, and malicious activities such as port scans. Typical alerts include, for example: 1) configuration downloads, including when an engineering station downloads code to a controller; 2) configuration upload, including when an engineering station retrieves a controller's code; 3) mode changes, including when a controller mode transition (e.g., program, run, or monitor) occurs; 4) firmware upgrades, including changes in controller firmware; 5) information change, including changes in an asset's unique identifiers (Internet protocol (IP) address, name, and so on); 6) online edits, including changes in the code while a controller is running; 7) new asset, including when a new asset initiates communications in the network; 8) failed logins, including any connection (re-)attempts; 9) man-in-the-middle events, including when a compromised device initiates an assignment of itself to two assets' IP addresses to intercept their exchanged traffic; 10) network scans, including when an asset scans open ports of multiple other assets; and 11) port scans, including when an asset scans ports of a single asset.

Layer C 406 can introduce a new model in cybersecurity automation that capitalizes on both end point monitoring and anomaly detection as a feed for a supervised ML model. The model can superimpose both the anomaly detection and endpoint security (e.g., EPP, EDR, XDR) to be carried out utilizing supervised machines learning ML methods such as Naïve Bayes, Decision Tree, Random Forest, K-Nearest Neighbors (KNN), Support Vector Machine (SVM), and Logistic Regression. The model testing method can be programmed to scan, detect, and filter in supervised ML. The test function can be based on considering an input that is endpoint devices (e.g., workstation: desktop/laptop, switch) and anomaly detection (system level) as shown in FIG. 7.

Figure 7:
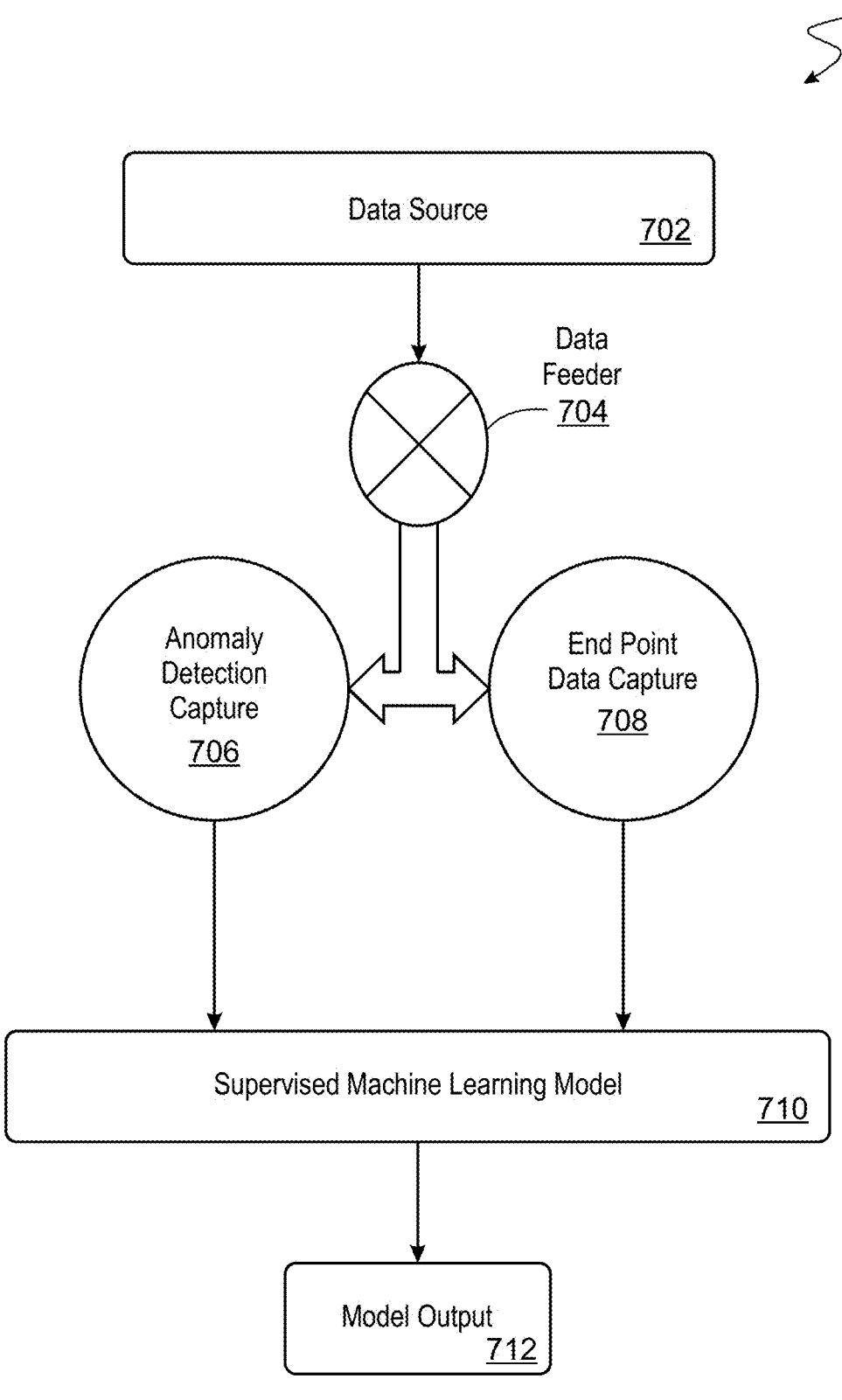
FIG. 7 is a diagram showing an example of a supervised machine learning model process, according to some implementations of the present disclosure.

FIG. 7 is a diagram showing an example of a supervised machine learning model process 700, according to some implementations of the present disclosure. The supervised machine learning model process 700 uses a data source 702. A data feeder 704 receives data from the data source 702 and supplies data used in anomaly detection capture 706 and end point data capture 708. Output of the data capture feeds into a supervised machine learning model 710 which produces model output 712.

The supervised machine learning model 710 enables both endpoint and anomaly dedication for the Layer A system components. As part of this, endpoint and anomaly dedication data can be collected and sent to a centralized database. The collected data from the different types of data capture can be tabulated in a unique database resulting in two different databases. Database correlation techniques can be used to extract meaningful data that can be fed, for example, into a ML model. The proposed model can be based on time index database collection. Each dedication type of collected data can be matched to a same time synchronization source to ensure a quality time index database.

This supervised machine learning model 710 can test three different datasets in order to identify the best supervised ML modeling method that is predicted to have the greatest accuracy rate and shortest execution time. The results can be utilized and implemented into the cybersecurity automation in Layer C, as the model result are the major goal of the model.

Model Testing

Model testing can include the following six steps. Step (1) of the model testing can include knowing and gathering data sets used to test the model.

Step (2) of the model testing can include ensuring that the endpoint detection considers the following: 1) antivirus and anti-malware (AV/AM) exists; 2) antivirus reporting is occurring to a central on-premises management server; 3) whether to rely upon static signatures and/or find the zero days; 4) antivirus mechanisms are shared with other machines or a manufacturer (e.g., through the Cloud); 5) data loss protection (DLP); 6) host intrusion prevention (HIP); 7) determining how central management servers will communicate with each other; 8) determining whether to rank solutions based on network segmentation, geographic considerations, or size of deployment; 9) frameworks are developed that are used for testing endpoint solutions 10: endpoint protection can support the operating systems 11) endpoint protection can interface with other security products on the endpoint (end devices) and 12) a computer can automatically be quarantined if malware is found.

Step (3) of the model testing can include ensuring that the compliance endpoint detection considers the following: 1)

standard engineering, networking system, and zoning compliance; 2) AV/AM; 3) whitelisting and event log compliance; 4) identification, authentication, authorization, and accountability compliance; 5) configuration baseline compliance.

Step (4) of the model testing can include test strategy, environment, and expected results (e.g., what and how). This can be summarized in Table 1:

TABLE 1

| Test Strategy, Environment, and Expected Results | | |
| --- | --- | --- |
| Test Strategy | Test Environment | Expected Results |
| 1 Gathering and collecting data: Import from one or more of files, databases, and the Internet Filtering (conditions) Deploy into a useful program, e.g., PYTHON | Information technology/ operational technology (IT/OT) systems, servers, and network, system database | Provide data that can be tested in the model. Focus on data that can be detected in the ML program. |
| 2 Test the ability of collecting logs from end points that are different in protocol and model type: Monitor network Find threats Create synthetic/real threats Make predictions using already found threats Determine the accuracy in percentage (%) of missed and detected threats Accept/reject the model <90% | IT/OT systems, servers, and network, system database. System set up based on multi-technologies and multi-protocols. | Logs based on the same standard format are collected in real-time |
| 3 Test the ability of collecting system level logs based on non-intrusive agent (anomaly detection) Find anomalies Create synthetic/real anomalies Make predictions using already found anomalies Determine the accuracy in percentage (%) of missed and detected anomalies Accept or reject the model based on a 90% accuracy level Accept the model having the greatest accuracy rate and shortest execution time | Traffic collection based on tapping into the different IT/OT system components | System level logs by acquiring data from the network link |
| 4 Time sync of the systems and end devices, network elements, and computing stations | IT/OT steady state operation based on a master time sync (e.g., using network time protocol (NTP)) | Logs and other collected data are based on the same time stamp |
| 5 Frequently test the ability of the antivirus/malware performance testing of online/offline attacks | Test protection platform | Test cycle and scoring system |
| 6 Analyze the test results to determine the suited endpoint detection and response (EDR) solutions for protecting | IT/OT cybersecurity threats | EDR best protecting solution |

TABLE 1-continued

| Test Strategy, Environment, and Expected Results | | |
| --- | --- | --- |
| Test Strategy | Test Environment | Expected Results |
| 7 Measuring data in terms of: Scale (low, medium, high) Time Accuracy Cost of implementation | IT/OT database | Data maturity Amount of data What is the cost of missing a threat or anomaly? |

Step (5) of the model testing can include data modeling and synthesis. The PYTHON programming language can be utilized to show the proper method of detecting the anomalous in terms of accuracy rate and best executed time. Endpoint devices for this model (e.g., workstations) can include desktops and laptops. Email platforms can be detected to filter the received emails into spam (bad and anomalous emails) and ham (good emails). For example, PYTHON programming language can be used in this model. PANDAS is a library written in PYTHON that is typically utilized for the purpose of data cleansing and analysis by data scientists. SKLEARN is a PYTHON machine learning library. Each library can offer classification, regression, clustering, and dimensionality reduction through a consistent interface. The modeling approach can be as follows utilizing the datasets: 1) loading the libraries; 2) loading the dataset; 3) selecting the feature and the label; 4) splitting the dataset to train and test sets; 5) vectorizing the texts in the dataset; 6) modeling using the ML methods (e.g., using Naïve Bayes, Decision Tree, Random Forest, K-Nearest Neighbors (KNN), Support Vector Machine (SVM), or Logistic Regression); and 7) comparing the supervised models based on the time and accuracy Step (6) of the model testing can include ML execution using steady state. A supervised ML modeling method that is determined to have the best accuracy rate and the shortest execution time can be implemented and recommended to address steady state operation.

Figure 8:
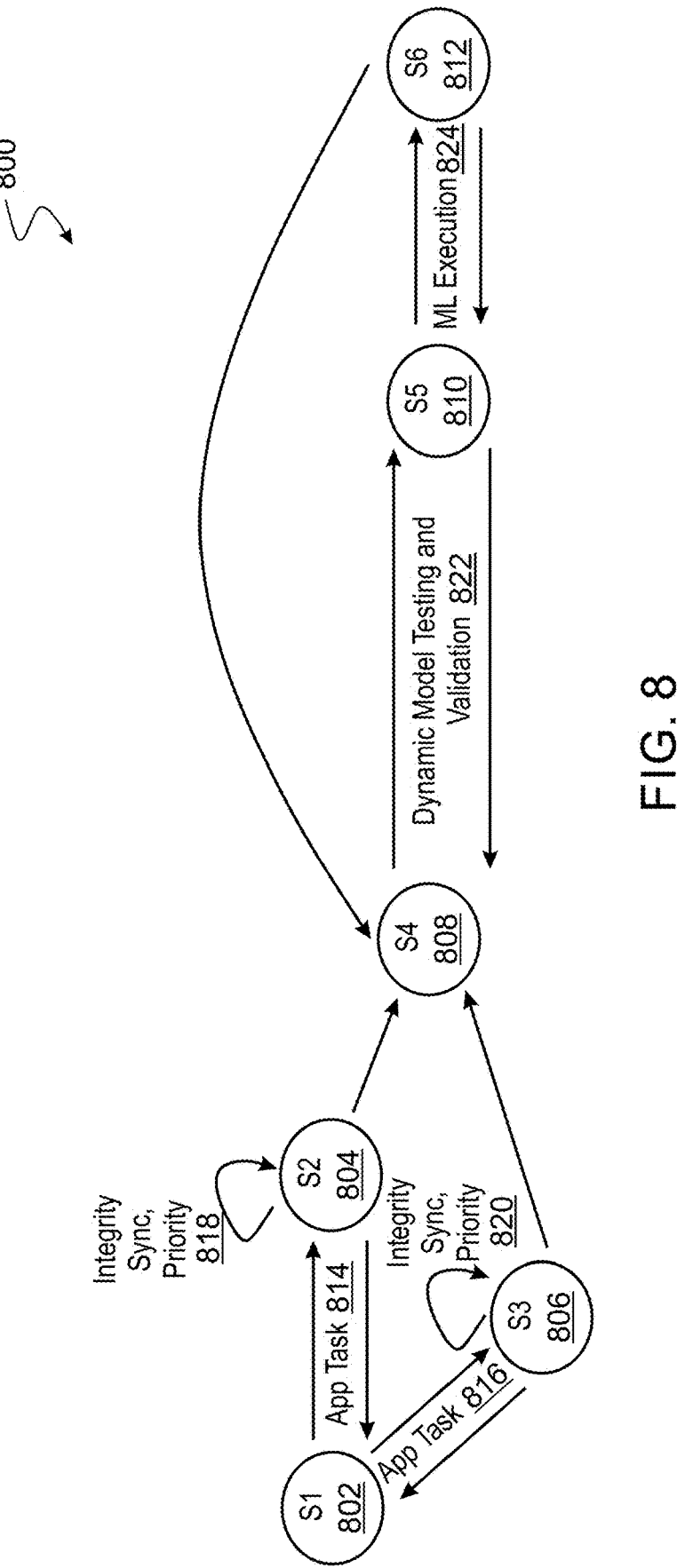
FIG. 8 is a diagram showing an example of a supervised machine learning model testing and model selection, according to some implementations of the present disclosure.

FIG. 8 is a diagram showing an example of a supervised machine learning model testing and model selection 800, according to some implementations of the present disclosure. For example, FIG. 8 shows a sample of state machine that can be duplicated for each cybersecurity attribute. For example, one of the cybersecurity attributes is disabling unused ports. In this example, the state machine for this attribute can depict the following steps. First, in a step involving a transition between State 1 802 and State 2 804 (e.g., application (app) task 814), each device can trigger a task to generate a log for the function of "enabling the disabled port." Second, in a validating step involving only State 2 804, the integrity of the task (e.g., integrity, sync, and priority 818) can be checked by determining if the task was initiated by an authorized user or a non-authorize user, e.g., based on the user access privilege. Third, in a step involving a transition between State 1 802 and State 3 806 (e.g., app task 816), a task is initiated to collect more logs, e.g., if the action in State 1 802 and/or State 2 804 is followed by changes in hardware and software configuration or higher-order application configuration changes. Fourth, in a step involving only State 4 808 (e.g., integrity, sync, and priority 820), a complete scan is initiated on vulnerabilities associated with State 1 802 to State 2 804 transition and State 1 802 to State 3 806 transition, and the complete scan is correlated to operational environments (e.g., scheduled workflows). This step can also scan to determine if there is a workflow (change management) request for the actual changes in State 1 to State 3. Fifth, in a step involving a transition between State 4 808 and State 5 810 (e.g., data model testing and validation 822), impacts of enabling the unused port are determined by analyzing the system behavior (e.g., sudden increases in central processing unit (CPU) usage, memory usage, changes in port traffic, new activated programs, and increases in numbers of detected anomalies) and triggering a decision (e.g., a decision to accept or initiate a mitigation). Information regarding the impact and the decision can be stored in State 6 812 as part of an AI/ML library. Sixth, in a step involving State 5 810 and State 4 808, an action/task is initiated to change or block recommendation for the port in question (e.g., to provide supervision). The recommendation is executed (e.g., supervised) by acknowledgement of an actual user, either locally or remotely or can be auto-triggered without additional acknowledgment. Seventh, in a step involving State 6 812, a complete profile of the transaction is stored, enabling the ability for recall upon a subsequent, similar State 1 802 to State 2 804 attempt. State 6 can be triggered directly after State 4 for transactions for which State 6 library has reached maturity in ML. In some implementations, cybersecurity-related compliance validation can include network and system compensation cybersecurity configurations for issues of the network and/or the system, misconfigurations of the network and/or the system, insecure connections in the network, software vulnerabilities in the network, and remote connections made to the network.

FIG. 9 is a flowchart of an example of a method 900 for monitoring a cybersecurity data analytics system, according to some implementations of the present disclosure. For clarity of presentation, the description that follows generally describes method 900 in the context of the other figures in this description. However, it will be understood that method 900 can be performed, for example, by any suitable system, environment, software, and hardware, or a combination of systems, environments, software, and hardware, as appropriate. In some implementations, various steps of method 900 can be run in parallel, in combination, in loops, or in any order.

At 902, an asset inventory of multiple systems (e.g., systems 104 described with reference to FIG. 1) is determined by a cybersecurity data analytics system, where the asset inventory includes systems in a network. Systems can include, for example, switches, workstations, servers, intelligent devices, and ETHERNET-enabled devices. In some implementations, the asset inventory can be determined by collecting logs that are generated from each device that are part of a system in which logs are stored in a database. Asset inventory information can also reside in the cybersecurity compliance tool database, which can serve as a tool for validating compliance to cybersecurity requirements. System profiles can also reside in an anomaly dedication system tool database where profile, attribute, and characterization of traffic flow can be learned. Asset inventory information can reside in an asset inventory database. These different databases can be accessed by the UA platform through standard APIs. The UA platform API's can be based on defined data templates that extract data from each of the unique databases forming a data lake. From 902, method 900 proceeds to 904.

At 904, a baseline activity of the systems is determined by the cybersecurity data analytics system by using the UA platform data lake. Determining the baseline activity of the systems can include monitoring the systems during a time in which cybersecurity is secure. Secure baseline activities and parameters for monitoring the activities can be developed using international standards (e.g., International Electrotechnical Commission (IEC) 62443, National Institute of Standards and Technology (NIST) special publication (SP) 800-53, NIST SP 800-82, etc.) or defined by the end users. Actual systems can be configured based on the standard requirements. These parameters can include parameters for hardening systems and associated devices with the cybersecurity capabilities that will satisfy standards requirements. For example, firewall policy configurations can be used that define which services are allowed to pass through the firewall and which services are to be blocked or filtered, e.g., based on source/destination IP addresses and TCP/UDP ports. Typically, Any-to-Any communications are not configured. Configurations can define access control and privileges to data.

In some implementations, cybersecurity parameters can include: role-based access and control instituted over the configuration ports (e.g., restrict access, least privilege); persistently monitoring the configuration ports to ensure the data access complies with the security policy; logging the access to configuration ports by each actor; logging the privileged user activity over configuration ports; alerting and alarming on specific messages or events detected on the access port; using proper or multi-factor authentication to configuration ports; insuring that the configuration ports are connected to an out-of-band or management specific network; segregating the out-of-band network from the normal or production network(s); encrypting communications to configuration ports (where supported by devices); and maintaining baseline configuration attributes specific to each system (typically provided by the vendor). From 904, method 900 proceeds to 906.

At 906, a real-time prediction model (e.g., machine-learning model) of endpoints is generated by the cybersecurity data analytics system and using the baseline activity. The real-time prediction model of endpoints includes endpoints communicating between systems in the network and reflects the baseline activity of, and communication among, the endpoints during the time in which cybersecurity is secure.

The prediction model can be based on each endpoint profile (e.g., IP address, function, location, and traffic flow behavior with its logical peers). The prediction model can include a complete logical mapping between the endpoints. Moreover, performance data for each logical mapping can be profiled and can be called in by computational functions when needed. From 906, method 900 proceeds to 908.

At 908, the systems are monitored by the cybersecurity data analytics system, including detecting, using the real-time model of endpoints, cybersecurity-related anomalies in the network that deviate from the baseline activity. System monitoring can include system identification, changes to critical systems, monitoring of remote connections, discovery of unusual and abnormal changes in system data, discovery and review of system vulnerabilities, discovery of dual homed systems, identification of configuration issues, identification of malware characteristics, pivots between IT and OT network zones, you dentification of suspicious or malicious files generated or received or transmitted by systems, credential dumping (e.g., Mimikatz), occurrence of unknown suspicious external connections, anomalous registry accesses and changes, ICS anomalous behavior/operations such as stop and start attacks, memory read and write attacks, modification of controller tasks, alert of ICS alarm suppression, identification of deviation from set baselines or malicious droppers on a system (e.g., UADA device).

In some implementations, cybersecurity-related anomalies can include network health issues of the network, network misconfigurations of the network, insecure connections in the network, software vulnerabilities in the network, and remote connections made to the network. In some implementations, monitoring can include displaying, in the user interface, indications of directions of communications and protocols being used and applied on information technology (IT) and operational technology (OT) protocols. Other examples include: system identification; changes to critical systems; monitoring remote connections; discovering unusual and abnormal changes; discovering and reviewing vulnerabilities; discovering dual-homed systems; identifying configuration issues; ICS/OT targeted malware; pivots between corporate IT and OT network zones; suspicious/malicious files; credential dumping (e.g., MIMICATZ); unknown suspicious external connections; anomalous WINDOWS registry accesses and changes; system anomalous behavior/operations such as stop and start attacks, memory read and write attacks, modification of controller tasks; alerts on ICS alarm suppression; reports on deviations from set baselines, and malicious droppers on workstations. From 908, method 900 proceeds to 910.

At 910, actionable alerts are generated by the cybersecurity data analytics system by using at least the detected cybersecurity-related anomalies. The actionable alerts are displayed in a user interface and notify of potential and actual process disruptions. After 910, method 900 can stop. The actionable alerts can include action plans. The action plans include automatic response actions that can be identified by prediction models as remedies for the identified cybersecurity threats. The response actions can be triggered to minimize a cyber security risk affecting one or more systems connect it to the network. For example, cyber threats can be classified in terms of cyber security risk as being at level zero (level 0), or minimal risk (level 1), or moderate risk (level 2) or high risk (level 3). Cyber threats identified as having a high risk for the network can be automatically minimized by implementing corresponding response actions. The response actions can include a modification of a firewall configuration such as a modification of configuration acquisitions for compliance with cybersecurity standards. In some implementations, the response actions can include isolation (e.g., interruption of network communication) of one or more systems exposed to a high cybersecurity risk to minimize vulnerabilities and to mitigate the detected threat. In response to action plan implementation, an auditing schedule can be implemented for future monitoring of system cybersecurity vulnerabilities.

Figure 10:
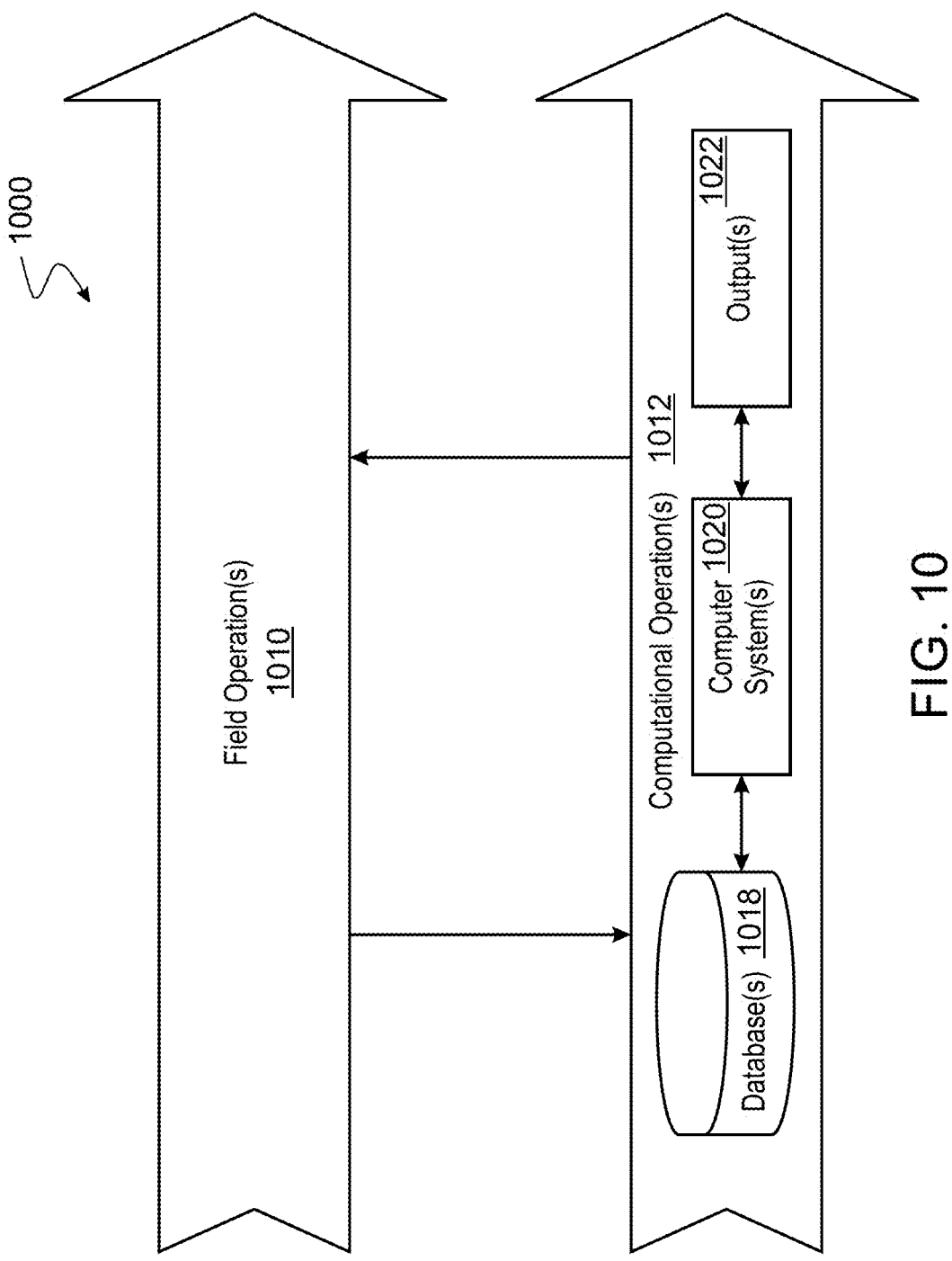
FIG. 10 illustrates hydrocarbon production operations that include both one or more field operations and one or more computational operations, which exchange information and control exploration for the production of hydrocarbons according to some implementations of the present disclosure.

FIG. 10 illustrates hydrocarbon production operations 1000 that include both one or more field operations 1010 and one or more computational operations 1012, which exchange information and control exploration for the production of hydrocarbons according to some implementations of the present disclosure. In some implementations, outputs of techniques of the present disclosure can be performed before, during, or in combination with the hydrocarbon production operations 1000, specifically, for example, either as field operations 1010 or computational operations 1012, or both.

Examples of field operations 1010 include forming/drilling a wellbore, hydraulic fracturing, producing through the wellbore, injecting fluids (such as water) through the wellbore, to name a few. In some implementations, methods of the present disclosure can trigger or control the field operations 1010. For example, the methods of the present disclosure can generate data from hardware/software including sensors and physical data gathering equipment (e.g., seismic sensors, well logging tools, flow meters, and temperature and pressure sensors). The methods of the present disclosure can include transmitting the data from the hardware/software to the field operations 1010 and responsively triggering the field operations 1010 including, for example, generating plans and signals that provide feedback to and control physical components of the field operations 1010. Alternatively or in addition, the field operations 1010 can trigger the methods of the present disclosure. For example, implementing physical components (including, for example, hardware, such as sensors) deployed in the field operations 1010 can generate plans and signals that can be provided as input or feedback (or both) to the methods of the present disclosure.

Examples of computational operations 1012 include one or more computer systems 1020 that include one or more processors and computer-readable media (e.g., non-transitory computer-readable media) operatively coupled to the one or more processors to execute computer operations to perform the methods of the present disclosure. The computational operations 1012 can be implemented using one or more databases 1018, which store data received from the field operations 1010 and/or generated internally within the computational operations 1012 (e.g., by implementing the methods of the present disclosure) or both. For example, the one or more computer systems 1020 process inputs from the field operations 1010 to assess conditions in the physical world, the outputs of which are stored in the databases 1018. For example, seismic sensors of the field operations 1010 can be used to perform a seismic survey to map subterranean features, such as facies and faults. In performing a seismic survey, seismic sources (e.g., seismic vibrators or explosions) generate seismic waves that propagate in the earth and seismic receivers (e.g., geophones) measure reflections generated as the seismic waves interact with boundaries between layers of a subsurface formation. The source and received signals are provided to the computational operations 1012 where they are stored in the databases 1018 and analyzed by the one or more computer systems 1020.

In some implementations, one or more outputs 1022 generated by the one or more computer systems 1020 can be provided as feedback/input to the field operations 1010 (either as direct input or stored in the databases 1018). The field operations 1010 can use the feedback/input to control physical components used to perform the field operations 1010 in the real world.

For example, the computational operations 1012 can process the seismic data to generate three-dimensional (3D) maps of the subsurface formation. The computational operations 1012 can use these 3D maps to provide plans for locating and drilling exploratory wells. In some operations, the exploratory wells are drilled using logging-while-drilling (LWD) techniques which incorporate logging tools into the drill string. LWD techniques can enable the computational operations 1012 to process new information about the formation and control the drilling to adjust to the observed conditions in real-time.

The one or more computer systems 1020 can update the 3D maps of the subsurface formation as information from one exploration well is received and the computational operations 1012 can adjust the location of the next exploration well based on the updated 3D maps. Similarly, the data received from production operations can be used by the computational operations 1012 to control components of the production operations. For example, production well and pipeline data can be analyzed to predict slugging in pipelines leading to a refinery and the computational operations 1012 can control machine operated valves upstream of the refinery to reduce the likelihood of plant disruptions that run the risk of taking the plant offline.

In some implementations of the computational operations 1012, customized user interfaces can present intermediate or final results of the above-described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or app), or at a central processing facility.

The presented information can include feedback, such as changes in parameters or processing inputs, that the user can select to improve a production environment, such as in the exploration, production, and/or testing of petrochemical processes or facilities. For example, the feedback can include parameters that, when selected by the user, can cause a change to, or an improvement in, drilling parameters (including drill bit speed and direction) or overall production of a gas or oil well. The feedback, when implemented by the user, can improve the speed and accuracy of calculations, streamline processes, improve models, and solve problems related to efficiency, performance, safety, reliability, costs, downtime, and the need for human interaction.

In some implementations, the feedback can be implemented in real-time, such as to provide an immediate or near-immediate change in operations or in a model. The term real-time (or similar terms as understood by one of ordinary skill in the art) means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions.

Described implementations of the subject matter can include one or more features, alone or in combination.

For example, in a first implementation, a computer-implemented method includes the following. An asset inventory is determined by a cybersecurity data analytics system. The asset inventory includes assets in a network. A baseline activity of the assets is determined by the cybersecurity data analytics system by using the asset inventory. The determining includes monitoring the assets during a time in which cybersecurity is secure. A real-time model of endpoints is generated by the cybersecurity data analytics system using the baseline activity. The real-time model of endpoints includes endpoints communicating between assets in the network and reflects the baseline activity of, and communication among, the endpoints during the time in which cybersecurity is secure. The assets are monitored by the cybersecurity data analytics system, including detecting, using the real-time model of endpoints, cybersecurity-related anomalies in the network that deviate from the baseline activity. Actionable alerts are generated by the cybersecurity data analytics system by using at least the detected cybersecurity-related anomalies. The actionable alerts are displayed in a user interface and notify of potential and actual process disruptions.

The foregoing and other described implementations can each, optionally, include one or more of the following features:

A first feature, combinable with any of the following features, where the cybersecurity-related anomalies include network health issues of the network, network misconfigurations of the network, insecure connections in the network, software vulnerabilities in the network, and remote connections made to the network.

A second feature, combinable with any of the previous or following features, where monitoring includes displaying, in the user interface, indications of directions of communications and protocols being used and applied on information technology (IT) and operational technology (OT) protocols.

A third feature, combinable with any of the previous or following features, where determining the asset inventory includes collecting, and using information from, logs that are generated from each asset.

A fourth feature, combinable with any of the previous or following features, where the assets include switches, workstations, servers, intelligent devices, and ETHERNET-enabled devices.

A fifth feature, combinable with any of the previous or following features, where the cybersecurity-related anomalies include sudden increases in central processing unit (CPU) usage, sudden changes in memory usage, sudden changes in port traffic, new activated programs, and increases in numbers of detected anomalies.

A sixth feature, combinable with any of the previous or following features, where determining the baseline activity includes monitoring activity using international standards.

In a second implementation, a non-transitory, computer-readable medium stores one or more instructions executable by a computer system to perform operations including the following. An asset inventory is determined by a cybersecurity data analytics system. The asset inventory includes assets in a network. A baseline activity of the assets is determined by the cybersecurity data analytics system by using the asset inventory. The determining includes monitoring the assets during a time in which cybersecurity is secure. A real-time model of endpoints is generated by the cybersecurity data analytics system using the baseline activity. The real-time model of endpoints includes endpoints communicating between assets in the network and reflects the baseline activity of, and communication among, the endpoints during the time in which cybersecurity is secure. The assets are monitored by the cybersecurity data analytics system, including detecting, using the real-time model of endpoints, cybersecurity-related anomalies in the network that deviate from the baseline activity. Actionable alerts are generated by the cybersecurity data analytics system by using at least the detected cybersecurity-related anomalies. The actionable alerts are displayed in a user interface and notify of potential and actual process disruptions.

The foregoing and other described implementations can each, optionally, include one or more of the following features:

A first feature, combinable with any of the following features, where the cybersecurity-related anomalies include network health issues of the network, network misconfigurations of the network, insecure connections in the network, software vulnerabilities in the network, and remote connections made to the network.

A second feature, combinable with any of the previous or following features, where monitoring includes displaying, in the user interface, indications of directions of communications and protocols being used and applied on information technology (IT) and operational technology (OT) protocols.

A third feature, combinable with any of the previous or following features, where determining the asset inventory includes collecting, and using information from, logs that are generated from each asset.

A fourth feature, combinable with any of the previous or following features, where the assets include switches, workstations, servers, intelligent devices, and ETHERNET-enabled devices.

A fifth feature, combinable with any of the previous or following features, where the cybersecurity-related anomalies include sudden increases in central processing unit (CPU) usage, sudden changes in memory usage, sudden changes in port traffic, new activated programs, and increases in numbers of detected anomalies.

A sixth feature, combinable with any of the previous or following features, where determining the baseline activity includes monitoring activity using international standards.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. An asset inventory is determined by a cybersecurity data analytics system. The asset inventory includes assets in a network. A baseline activity of the assets is determined by the cybersecurity data analytics system by using the asset inventory. The determining includes monitoring the assets during a time in which cybersecurity is secure. A real-time model of endpoints is generated by the cybersecurity data analytics system using the baseline activity. The real-time model of endpoints includes endpoints communicating between assets in the network and reflects the baseline activity of, and communication among, the endpoints during the time in which cybersecurity is secure. The assets are monitored by the cybersecurity data analytics system, including detecting, using the real-time model of endpoints, cybersecurity-related anomalies in the network that deviate from the baseline activity. Actionable alerts are generated by the cybersecurity data analytics system by using at least the detected cybersecurity-related anomalies. The actionable alerts are displayed in a user interface and notify of potential and actual process disruptions.

The foregoing and other described implementations can each, optionally, include one or more of the following features:

A first feature, combinable with any of the following features, where the cybersecurity-related anomalies include network health issues of the network, network misconfigurations of the network, insecure connections in the network, software vulnerabilities in the network, and remote connections made to the network.

A second feature, combinable with any of the previous or following features, where monitoring includes displaying, in the user interface, indications of directions of communications and protocols being used and applied on information technology (IT) and operational technology (OT) protocols.

A third feature, combinable with any of the previous or following features, where determining the asset inventory includes collecting, and using information from, logs that are generated from each asset.

A fourth feature, combinable with any of the previous or following features, where the assets include switches, workstations, servers, intelligent devices, and ETHERNET-enabled devices.

A fifth feature, combinable with any of the previous or following features, where the cybersecurity-related anomalies include sudden increases in central processing unit (CPU) usage, sudden changes in memory usage, sudden changes in port traffic, new activated programs, and increases in numbers of detected anomalies.

A sixth feature, combinable with any of the previous or following features, where determining the baseline activity includes monitoring activity using international standards.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access and/or interact with the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," and "electronic computer device" (or equivalent as understood by one of ordinary skill in the art) refer to data processing hardware. For example, a data processing apparatus can encompass any kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a USB flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, high-density (HD)-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at the application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
determining, by a cybersecurity data analytics system, a plurality of systems connected to a network, the plurality of systems comprising industrial systems and non-industrial systems;
determining, by the cybersecurity data analytics system and by using an asset inventory, a baseline activity of the plurality of systems, comprising monitoring the plurality of systems during a time in which cybersecurity is secure;
generating, by the cybersecurity data analytics system and using the baseline activity, a real-time model of endpoints, wherein the real-time model of endpoints comprises endpoints communications between the plurality of systems in the network and reflects the baseline activity of, and communication among, the endpoints during the time, in which cybersecurity is secure;
monitoring, by the cybersecurity data analytics system, the plurality of systems, comprising detecting, using the real-time model of endpoints and as detected cybersecurity-related anomalies relative to updated workflows, cybersecurity-related anomalies in the network that deviate from the baseline activity; and
generating, by the cybersecurity data analytics system and using at least the detected cybersecurity-related anomalies, actionable alerts displayed in a user interface and notifying of potential and actual process disruptions, the actionable alerts being mapped to a cybersecurity profile.

2. The computer-implemented method of claim 1, wherein the cybersecurity-related anomalies comprise network health issues of the network, network misconfigurations of the network, insecure connections in the network, software vulnerabilities in the network, and remote connections made to the network.

3. The computer-implemented method of claim 1, wherein monitoring comprises displaying, in the user interface, indications of directions of communications and protocols being used and applied on information technology (IT) and operational technology (OT) protocols.

4. The computer-implemented method of claim 1, wherein the asset inventory comprises information from, logs that are generated by the plurality of systems.

5. The computer-implemented method of claim 1, wherein the plurality of systems comprise switches, workstations, servers, intelligent devices, and ETHERNET-enabled devices.

6. The computer-implemented method of claim 1, wherein the cybersecurity-related anomalies comprise sudden increases in central processing unit (CPU) usage, sudden changes in memory usage, sudden changes in port traffic, new activated programs, and increases in numbers of detected anomalies.

7. The computer-implemented method of claim 1, wherein determining the baseline activity comprises monitoring activity using international standards.

8. A non-transitory, computer-readable medium storing one or more instructions executable by a computer system to perform operations comprising:
determining, by a cybersecurity data analytics system, a plurality of systems connected to a network, the plurality of systems comprising industrial systems and non-industrial systems;
determining, by the cybersecurity data analytics system and using an asset inventory, a baseline activity of the plurality of systems, comprising monitoring the plurality of systems during a time in which cybersecurity is secure;
generating, by the cybersecurity data analytics system and using the baseline activity, a real-time model of endpoints, wherein the real-time model of endpoints comprises endpoints communications between the plurality of systems in the network and reflects the baseline activity of, and communication among, the endpoints during the time, in which cybersecurity is secure;
monitoring, by the cybersecurity data analytics system, the plurality of systems, comprising detecting, using the real-time model of endpoints and as detected cybersecurity-related anomalies relative to updated workflows, cybersecurity-related anomalies in the network that deviate from the baseline activity; and
generating, by the cybersecurity data analytics system and using at least the detected cybersecurity-related anomalies, actionable alerts displayed in a user interface and notifying of potential and actual process disruptions, the actionable alerts being mapped to a cybersecurity profile.

9. The non-transitory, computer-readable medium of claim 8, wherein the cybersecurity-related anomalies comprise network health issues of the network, network misconfigurations of the network, insecure connections in the network, software vulnerabilities in the network, and remote connections made to the network.

10. The non-transitory, computer-readable medium of claim 8, wherein monitoring comprises displaying, in the user interface, indications of directions of communications and protocols being used and applied on information technology (IT) and operational technology (OT) protocols.

11. The non-transitory, computer-readable medium of claim 8, wherein the asset inventory comprises information from, logs that are generated by the plurality of systems.

12. The non-transitory, computer-readable medium of claim 8, wherein the plurality of systems comprise switches, workstations, servers, intelligent devices, and ETHERNET-enabled devices.

13. The non-transitory, computer-readable medium of claim 8, wherein the cybersecurity-related anomalies comprise sudden increases in central processing unit (CPU) usage, sudden changes in memory usage, sudden changes in port traffic, new activated programs, and increases in numbers of detected anomalies.

14. The non-transitory, computer-readable medium of claim 8, wherein determining the baseline activity comprises monitoring activity using international standards.

15. A computer-implemented system, comprising:

one or more processors; and a non-transitory computer-readable storage medium coupled to the one or more processors and storing programming instructions for execution by the one or more processors, the programming instructions instructing the one or more processors to perform operations comprising:

determining, by a cybersecurity data analytics system, a plurality of systems connected to a network, the plurality of systems comprising industrial systems and non-industrial systems;

determining, by the cybersecurity data analytics system and using an asset inventory, a baseline activity of the plurality of systems, comprising monitoring the plurality of systems during a time in which cybersecurity is secure;

generating, by the cybersecurity data analytics system and using the baseline activity, a real-time model of endpoints, wherein the real-time model of endpoints comprises endpoints communications between the plurality of systems in the network and reflects the baseline activity of, and communication among, the endpoints during the time, in which cybersecurity is secure;

monitoring, by the cybersecurity data analytics system, the plurality of systems, comprising detecting, using the real-time model of endpoints and as detected cybersecurity-related anomalies relative to updated workflows, cybersecurity-related anomalies in the network that deviate from the baseline activity; and generating, by the cybersecurity data analytics system and using at least the detected cybersecurity-related anomalies, actionable alerts displayed in a user interface and notifying of potential and actual process disruptions, the actionable alerts being mapped to a cybersecurity profile.

16. The computer-implemented system of claim 15, wherein the cybersecurity-related anomalies comprise network health issues of the network, network misconfigurations of the network, insecure connections in the network, software vulnerabilities in the network, and remote connections made to the network.

17. The computer-implemented system of claim 15, wherein monitoring comprises displaying, in the user interface, indications of directions of communications and protocols being used and applied on information technology (IT) and operational technology (OT) protocols.

18. The computer-implemented system of claim 15, wherein the asset inventory comprises information from, logs that are generated by the plurality of systems.

19. The computer-implemented system of claim 15, wherein the plurality of systems comprise switches, workstations, servers, intelligent devices, and ETHERNET-enabled devices.

20. The computer-implemented system of claim 15, wherein the cybersecurity-related anomalies comprise sudden increases in central processing unit (CPU) usage, sudden changes in memory usage, sudden changes in port traffic, new activated programs, and increases in numbers of detected anomalies.

* * * * *